United States Patent
Tanaka et al.

(10) Patent No.: US 11,103,992 B2
(45) Date of Patent: Aug. 31, 2021

(54) APPARATUS OF CONTINUUM ROBOT

(71) Applicant: Canon U.S.A. Inc., Melville, NY (US)

(72) Inventors: Yusuke Tanaka, Tokyo (JP); Kiyoshi Takagi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 432 days.

(21) Appl. No.: 15/901,599

(22) Filed: Feb. 21, 2018

(65) Prior Publication Data

US 2018/0243900 A1 Aug. 30, 2018

Related U.S. Application Data

(60) Provisional application No. 62/464,898, filed on Feb. 28, 2017, provisional application No. 62/464,921, filed on Feb. 28, 2017.

(51) Int. Cl.
*B25J 9/06* (2006.01)
*B25J 9/16* (2006.01)
(Continued)

(52) U.S. Cl.
CPC ............ *B25J 9/065* (2013.01); *B25J 9/104* (2013.01); *B25J 9/1625* (2013.01); *B25J 9/1635* (2013.01);
(Continued)

(58) Field of Classification Search
CPC . B25J 9/065; B25J 9/104; B25J 9/1625; B25J 18/06; B25J 9/06; B25J 9/1045;
(Continued)

(56) References Cited

U.S. PATENT DOCUMENTS 7,775,972 B2 8/2010 Brock et al.
8,603,068 B2 12/2013 Weitzner et al.
(Continued)

FOREIGN PATENT DOCUMENTS

JP H5-76482 A 3/1993
JP H0796479 A 4/1995
(Continued)

OTHER PUBLICATIONS

Gerboni et al., HelixFlex : bioinspired maneuverable instrument for skull base surgery, Bioinspir. Biomim. 10 (2015) 066013. (Year: 2015).

*Primary Examiner* — Dale Moyer
(74) *Attorney, Agent, or Firm* — Canon U.S.A., Inc., IP Division

(57) ABSTRACT

A wire-driven manipulator including a driver, a first deforming section including a first distal member, a plurality of first guide members, and a plurality of first wires, and a second deforming section provided between the first deforming section and the driver with the second deforming section including a second distal member, a plurality of second guide members, and a plurality of second wires. The plurality of first wires are fixed to the first distal member, and at least one of the plurality of first wires is further fixed to the plurality of first guide members and other wires of the plurality of the first wires are slidable with respect to the plurality of first guide members. The plurality of second wires are fixed to the second distal member, and at least one of the plurality of second wires is further fixed to the plurality of second guide members and the other wires of the plurality of the first wires are slidable with respect to the plurality of second guide members. In addition, the length of the first deforming section is shorter than the length of the second deforming section.

15 Claims, 28 Drawing Sheets

(51) Int. Cl.
*B25J 18/06* (2006.01)
*B25J 9/10* (2006.01)
(52) U.S. Cl.
CPC .............. *B25J 18/06* (2013.01); *Y10S 901/02* (2013.01); *Y10S 901/15* (2013.01)
(58) Field of Classification Search
CPC ......... B25J 9/1635; G05B 2219/39186; G05B 2219/40234; G05B 2219/40279; Y10S 901/02; Y10S 901/15
See application file for complete search history.

(56) References Cited

U.S. PATENT DOCUMENTS

| | | | |
|---|---|---|---|
| 8,721,530 B2 | 5/2014 | Ohline et al. | |
| 8,992,421 B2 | 3/2015 | Stand et al. | |
| 2005/0107667 A1* | 5/2005 | Danitz | A61B 1/0055 600/139 |
| 2006/0199999 A1* | 9/2006 | Ikeda | A61B 1/00149 600/141 |
| 2008/0002746 A1 | 1/2008 | Narayan | |
| 2010/0280449 A1 | 11/2010 | Alvarez | |
| 2011/0012516 A1 | 1/2011 | Klinghult | |
| 2011/0125165 A1 | 5/2011 | Simaan et al. | |
| 2013/0197306 A1* | 8/2013 | Armand | A61B 17/3421 600/109 |
| 2013/0300537 A1 | 11/2013 | Bajo et al. | |
| 2014/0243592 A1* | 8/2014 | Kato | A61B 1/008 600/104 |
| 2014/0330432 A1* | 11/2014 | Simaan | B25J 9/1633 700/250 |
| 2015/0122071 A1* | 5/2015 | Lee | B25J 17/00 74/490.04 |
| 2015/0313619 A1* | 11/2015 | Tadano | A61B 34/71 606/130 |
| 2016/0008990 A1* | 1/2016 | Franz | A61B 1/0057 74/490.05 |
| 2016/0022960 A1* | 1/2016 | Hatta | A61B 1/0055 604/95.01 |

FOREIGN PATENT DOCUMENTS

| | | |
|---|---|---|
| JP | H10258020 A | 9/1998 |
| JP | 2009018116 A | 1/2009 |
| JP | 2012005868 A | 1/2012 |
| JP | 2015023951 A | 2/2015 |
| WO | 2015/083644 A1 | 6/2015 |
| WO | 2017/006375 A1 | 4/2018 |

\* cited by examiner

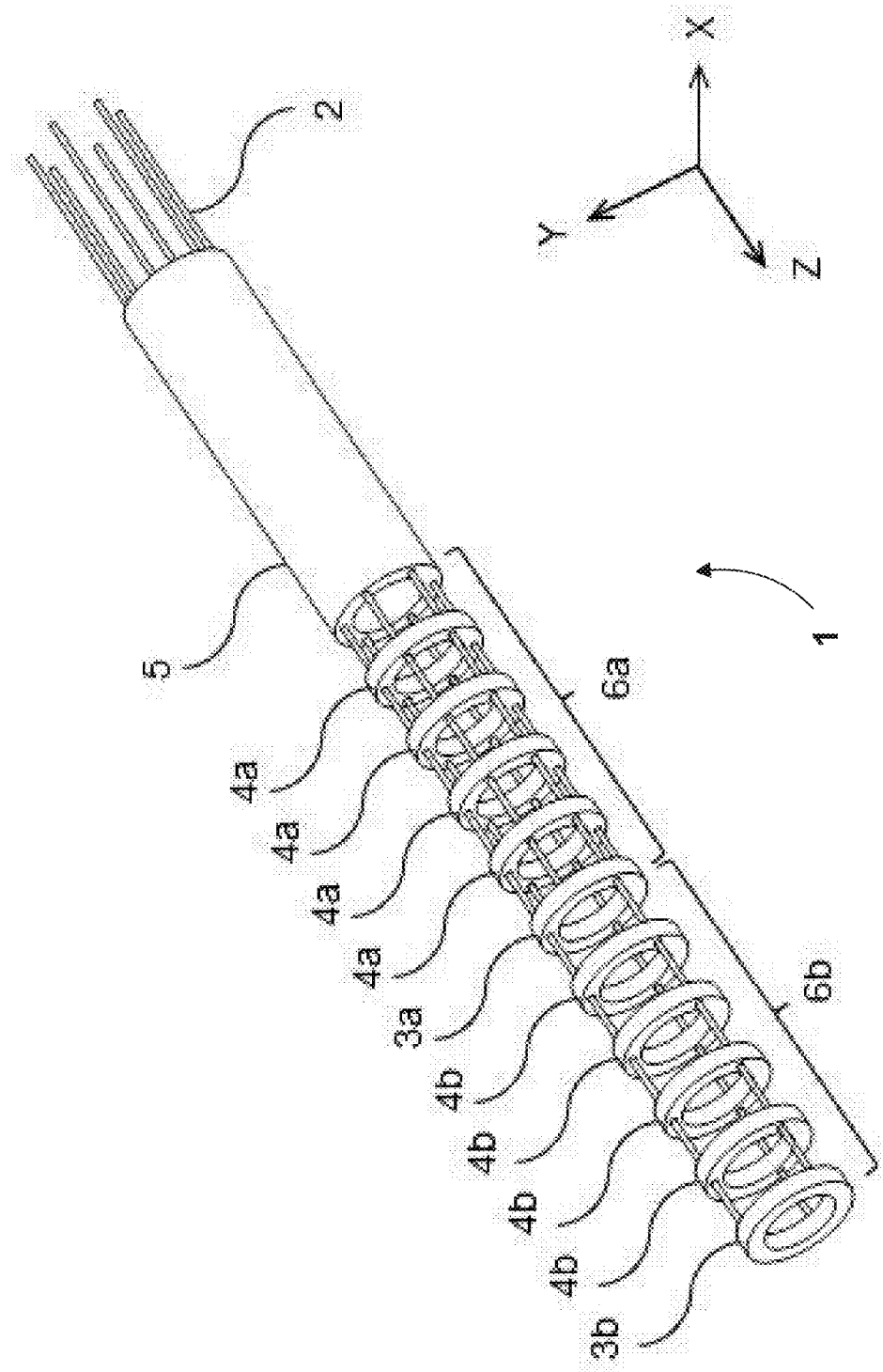

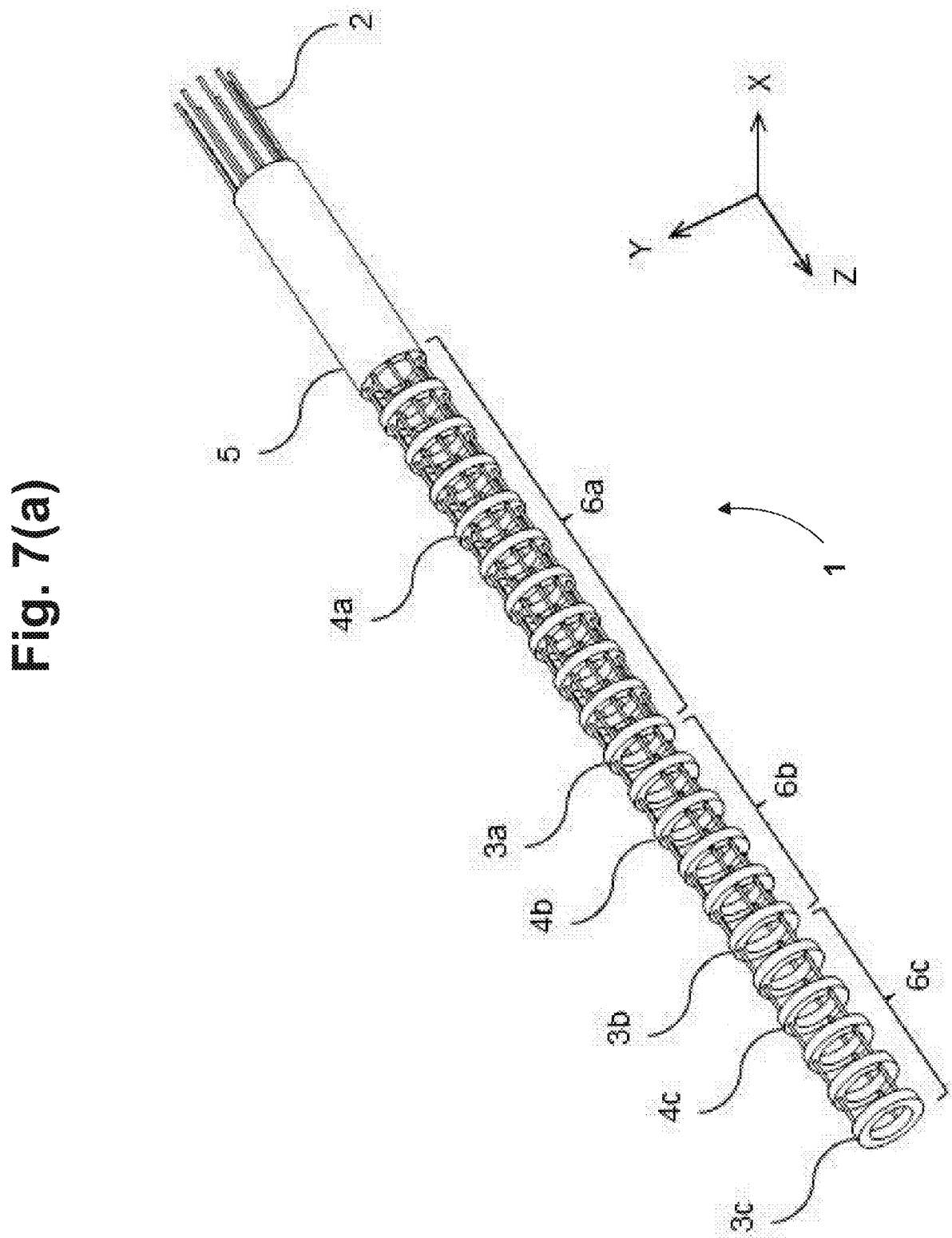

Fig. 7(b)
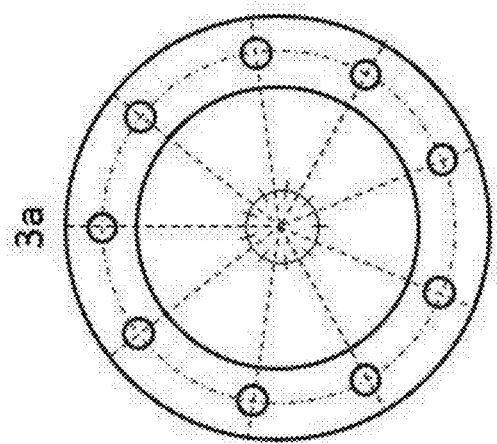
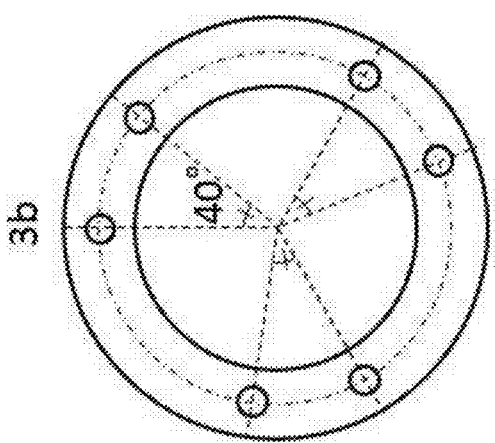
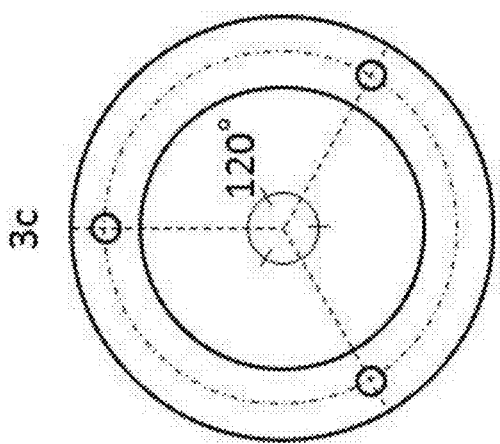

APPARATUS OF CONTINUUM ROBOT

CROSS-REFERENCE TO RELATED APPLICATIONS

This application claims the benefit of priority of U.S. Provisional Patent Application No. 62/464,898, filed on Feb. 28, 2017, and U.S. Provisional Patent Application No. 62/464,921, filed on Feb. 28, 2017, which are hereby incorporated by reference herein in their entirety.

BACKGROUND

This application generally concerns continuum robots.

A continuum robot includes a plurality of bending sections having a flexible structure. The shape of the continuum robot is controlled by deforming the bending sections. In one example, a pair of neighboring bending sections is controlled such that the bending shape of the following section follows the bending shape of the leading section, so that as the base advances, the shape is continuously propagated.

This robot has mainly two advantages over a robot configured with rigid links. The first advantage is that the continuum robot can move along a curve in a narrow space or in an environment with scattered substances in which the rigid-link robot may get stuck. The second advantage is that since the continuum robot has substantial flexibility, the continuum robot can be manipulated without damage to a fragile path.

However, if the control method of continuously propagating the bending angle of the most distal end to that of the follower section is applied to a configuration in which the length of the follower section is longer than the length of the leading section, the difference between the bending angle of the follower section and the bending angle of the leading section increases. In this case, the continuum robot is more likely to contact an obstruction in a narrow space. Such contact would likely cause increased friction and could result in damage to the continuum robot or to the path.

SUMMARY

Some embodiments of a wire-driven manipulator comprise a driver, a first deforming section including a first distal member, a plurality of first guide members, and a plurality of first wires, and a second deforming section provided between the first deforming section and the driver with the second deforming section including a second distal member, a plurality of second guide members, and a plurality of second wires. The plurality of first wires are fixed to the first distal member, and at least one of the plurality of first wires is further fixed to the plurality of first guide members and other wires of the plurality of the first wires are slidable with respect to the plurality of first guide members. The plurality of second wires are fixed to the second distal member, and at least one of the plurality of second wires is further fixed to the plurality of second guide members and the other wires of the plurality of the first wires are slidable with respect to the plurality of second guide members. In addition, the length of the first deforming section is shorter than the length of the second deforming section.

BRIEF DESCRIPTION OF THE DRAWINGS

FIG. 6(a) is a perspective view showing a configuration of a wire-driven manipulator with two sections.

FIG. 7(a) is a perspective view showing a configuration of a wire-driven manipulator with three sections. FIG. 7(b) is a plane view guide members.

DETAILED DESCRIPTION

A mechanism of a continuum robot is described according to a first embodiment. Description is provided below in detail and control results obtained by simulations are provided.

Basic Configuration of the Mechanism

Figure 1:
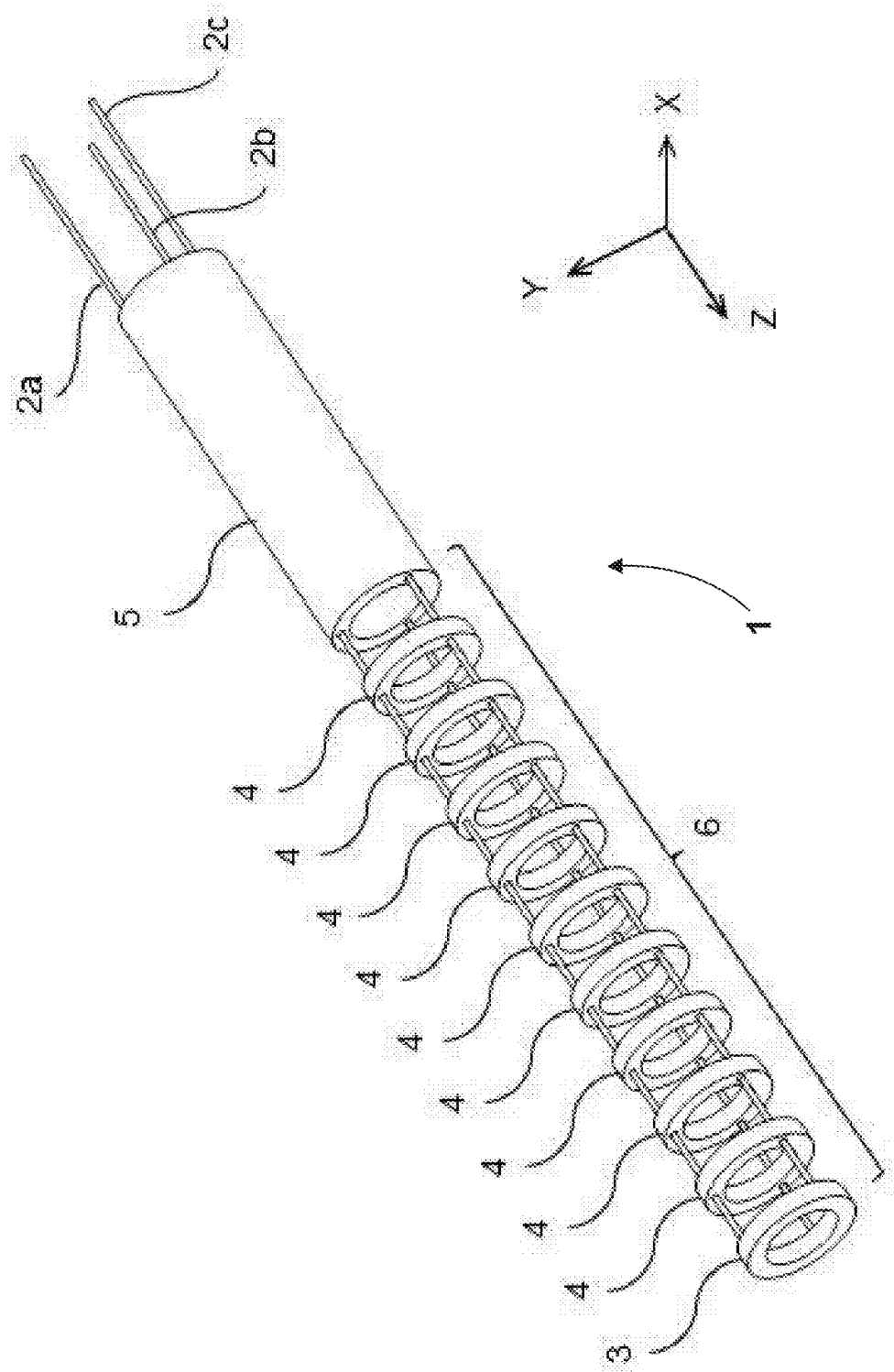
FIG. 1 is a perspective view showing a configuration of a wire-driven manipulator.

FIG. 1 is a perspective view of a wire-driven manipulator 1 according to a first configuration. The wire-driven manipulator 1 includes linear members 2a, 2b, and 2c, a distal member 3, guide members 4, and a support member 5. The linear members 2a, 2b, and 2c are arranged in a direction parallel to the Z-axis and are coupled to the distal member 3 at a terminal end on the +Z side in the Z-axis direction. Linear members 2a, 2b, and 2c are coupled to drivers 7 (not shown) at a terminal end on the −Z side in the Z-axis direction. The linear members 2a, 2b, and 2c can be metal wires, for example, piano wires, stainless-steel wires, or nickel-titanium-alloy wires. The distal member 3 has an annular shape with the center axis thereof extending along the Z-axis direction. and is coupled to the linear members 2a, 2b, and 2c, for example, by bonding, pinning, or screwing.

Figure 2:
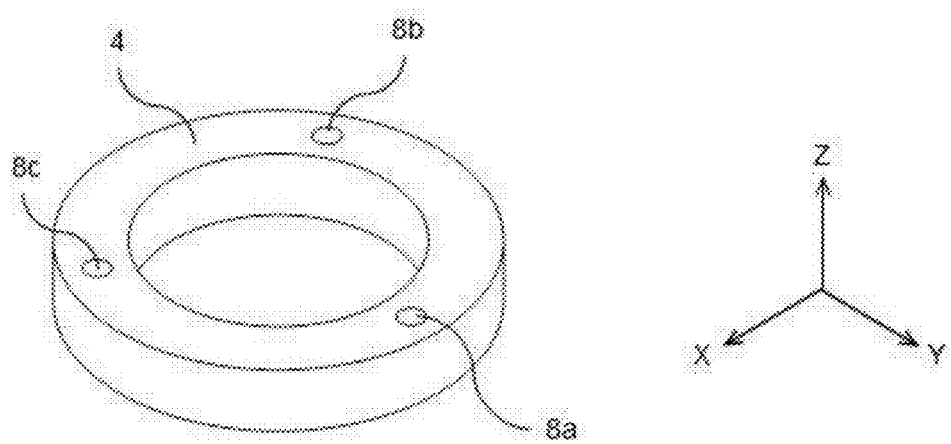
FIG. 2 is a perspective view showing a guide member.

As shown in FIG. 2, a representative guide member 4 has an annular shape with the center axis thereof extending along the Z-axis direction and has guide holes 8a, 8b, and 8c penetrating through the guide member 4 in the Z-axis direction. The guide holes 8a, 8b, and 8c are arranged to allow the linear members 2a, 2b, and 2c to respectively pass through the guide holes 8a, 8b, and 8c. Among the linear members 2a, 2b, and 2c, the linear member 2a is fixed to the guide member 4 at the guide hole 8a by, for example, bonding, pinning, or screwing, and the linear members 2b and 2c are slidable with respect to the guide holes 8b and 8c. Since the guide member 4 contacts the linear members 2b and 2c through the guide holes 8b and 8c, the guide member 4 can include a member such as a resin with a small coefficient of friction.

The support member 5 has a cylindrical shape with the center axis thereof extending along the Z-axis direction. The support member 5 has holes penetrating through the support member 5 in the Z-axis direction similarly to the guide member 4. The holes are arranged to allow the linear members 2a, 2b, and 2c to pass through the holes. The linear members 2a, 2b, and 2c are slidable with respect to the through holes formed in the support member 5. The support member 5 has a function of transmitting a force, when the linear members 2a, 2b, and 2c passing through the through holes of the support member 5 are driven in the Z-axis direction, without the buckling of the linear members 2a, 2b, and 2c. A bending section (deforming section) 6 is a portion extending from the distal member 3 to the distal end on the +Z side in the Z-axis direction of the support member 5, and is a section that provides a bending motion when the linear members 2a, 2b, and 2c are driven.

The linear members 2a, 2b, and 2c are coupled to the drivers 7 (not shown) at their respective terminal ends on the −Z side in the Z-axis direction, and the drivers 7 have mechanisms that can independently drive the linear members 2a, 2b, and 2c in the Z-axis direction by pushing and pulling the linear members 2a, 2b, and 2c.

Figure 3:
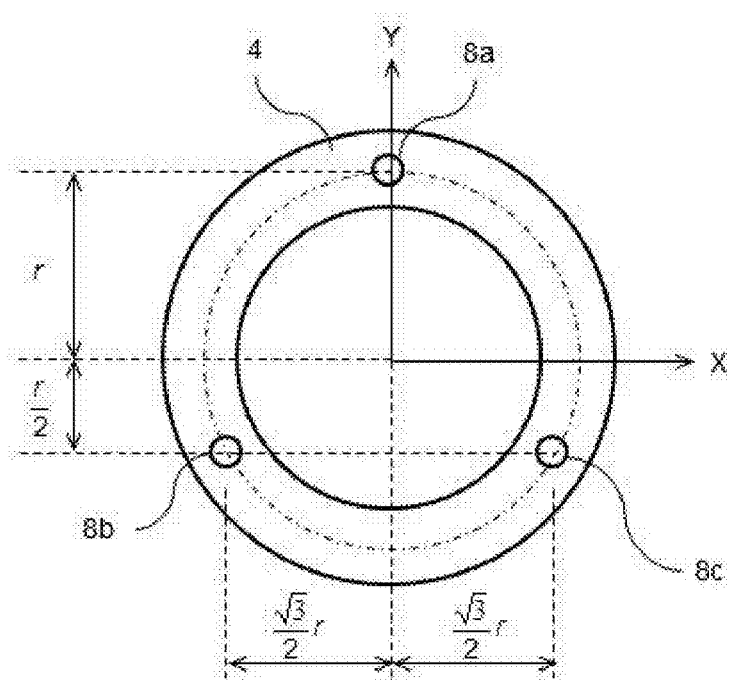
FIG. 3 is a plan view showing the guide member.
Figure 4:
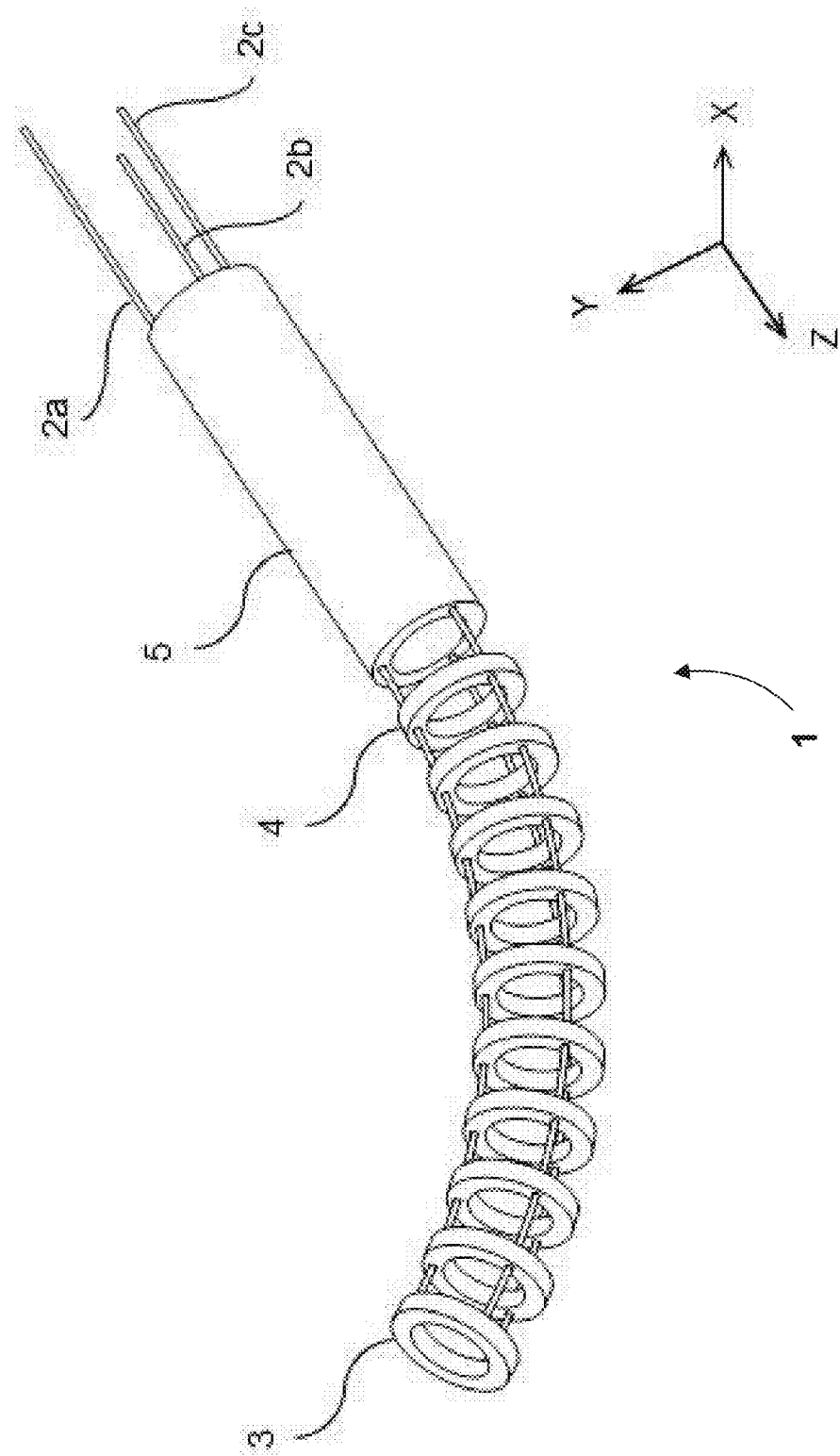
FIG. 4 is a perspective view showing deformation of the wire-driven manipulator when a linear member is driven.
Figure 5:
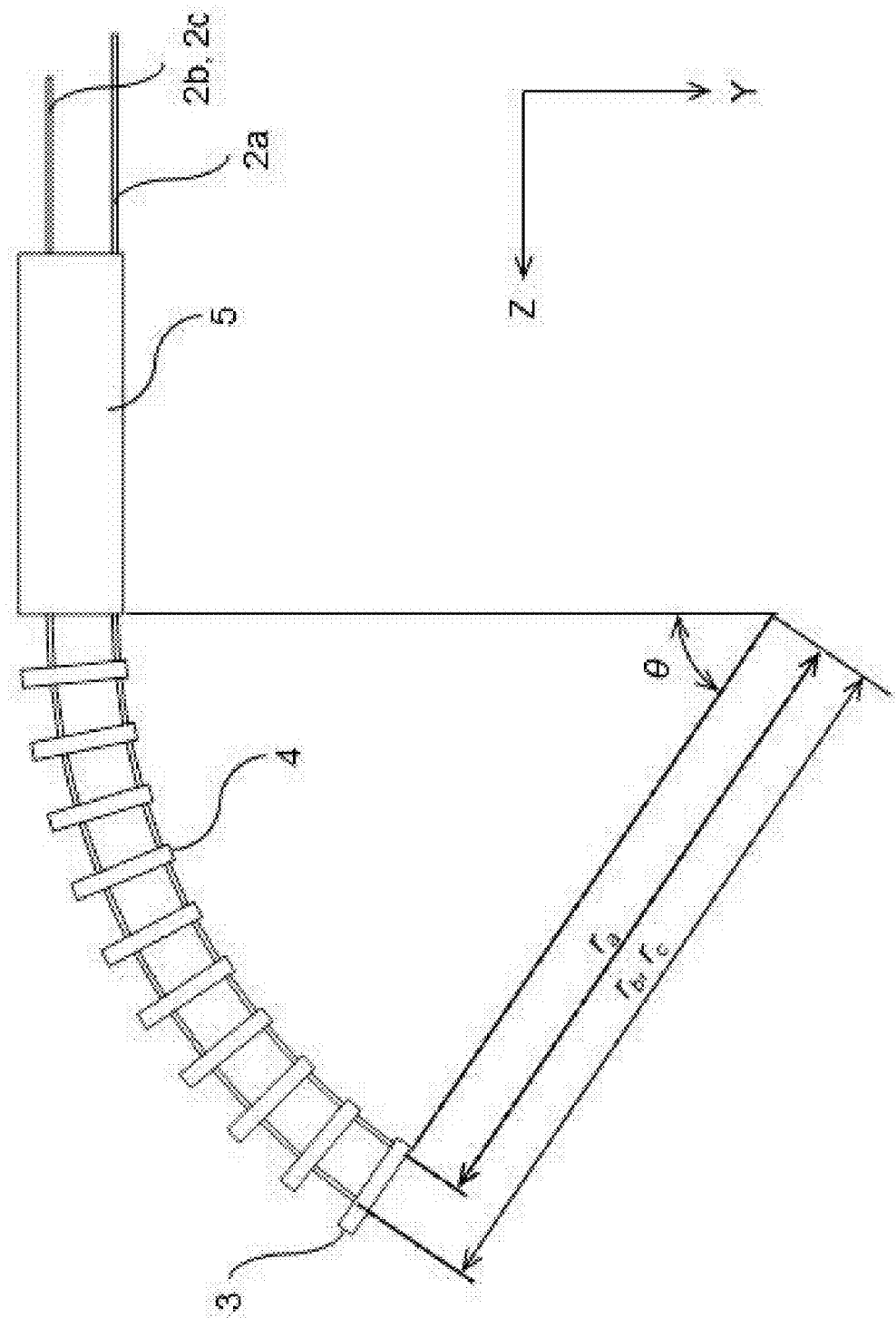
FIG. 5 is a plan view showing deformation of the wire-driven manipulator when the linear member is driven.

The bending motion of the wire-driven manipulator when the linear members 2a, 2b, and 2c are driven is described next. As shown in FIG. 3, the guide holes 8a, 8b, and 8c of the guide member 4 are arranged at the respective vertices of a regular triangle inscribed in a circle with a radius r from the center of the guide member 4. The guide hole 8a is located on the Y-axis. For an example of the bending motion of the wire-driven manipulator, FIG. 4 shows a perspective view and FIG. 5 shows a Y-Z plan view of a bending state of the bending section 6 when the linear members 2b and 2c are driven by a driving displacement $l_p$ on the +Z side in the Z-axis direction.

When $\theta$ denotes a change in angle of the distal member after driving and l denotes a length of the bending section 6 before driving, the bending section 6 bends in the Y-Z plane while maintaining a constant curvature. When $r_a$, $r_b$, and $r_c$ respectively denote curvature radii of the linear members 2a, 2b, and 2c, the following relationship can be obtained with reference to FIG. 5.

$$r_a \cdot \theta = l \tag{1}$$

$$r_b \cdot \theta = l + l_p \tag{2}$$

$$r_c \cdot \theta = l + l_p \tag{3}$$

Also, as can be seen in FIG. 3, the distance between the guide hole 8a and the guide holes 8b and 8c projected in the Y-Z plane is 3r/2, and hence the following relationship can be obtained.

$$r_a = r_b - \frac{3r}{2} = r_c - \frac{3r}{2} \tag{4}$$

By using Expressions (1), (2), (3), and (4), the following relationship can be obtained.

$$\theta = \frac{2l_p}{3r} \tag{5}$$

The configuration above has been described such that the bending section 6 is bent in the Y-Z plane by driving the linear members 2b and 2c on the +Z side in the Z-axis direction while the linear member 2a is fixed. When the linear members 2b and 2c are respectively driven on the +Z side in the Z-axis direction by the driving displacement $l_p$ and on the −Z side in the Z-axis direction by the driving displacement $l_p$ while the linear member 2a is fixed, the bending section 6 can be bent in the X-Z plane. If the deformation in the X-Z plane is considered similarly to the deformation in the Y-Z plane, when $\theta$ denotes a change in angle of the distal member after driving, l denotes a length of the bending section 6 before driving, and $r_a$, $r_b$, and $r_c$ respectively denote curvature radii of the linear members 2a, 2b, and 2c, the following relational expression can be obtained.

$$r_a \cdot \theta = l \tag{6}$$

$$r_b \cdot \theta = l + l_p \tag{7}$$

$$r_c \cdot \theta = l - l_p \tag{8}$$

$$r_a = r_b - \frac{\sqrt{3}\, r}{2} \tag{9}$$

By using Expressions (6), (7), (8), and (9), the following relationship can be obtained:

$$\theta = \frac{2l_p}{\sqrt{3}\, r} \tag{10}$$

Further, the bending section 6 can be bent in a desirable plane containing the Z-axis, in accordance with a combination of the driving amounts of the linear members 2b and 2c. To control the posture of the distal member 3, driving two of the three linear members 2 is sufficient. In this case, the driver 7 coupled to the linear member 2 that is not driven may not actually have a driving mechanism. Therefore, it is desirable to drive two linear members while not driving one linear member, in order to reduce the space occupied by the drivers 7. Also, the linear member 2 that is not driven may be the linear member 2 coupled at the guide hole 8 of the guide member 4. Also, if the direction in which the wire-driven manipulator 1 is desired to be bent is previously determined, one of the three linear members 2 may be driven while the remaining two linear members 2 are not driven.

Further, a mechanism that rotates the wire-driven manipulator around the Z-axis may be additionally provided, and the bending section 6 may be bent in a desirable direction by driving only one linear member. In this case, two of the three linear members 2 may be fixed to the guide member 4. For example, the linear members 2 that are not driven by the driver 7 may be fixed to the guide member 4, and the linear member 2 that is driven by the driver 7 may slide with respect to the guide member 4 without being fixed to the guide member 4.

The guide member 4 has a function of preventing the linear members 2 from buckling when the bending section 6 is bent, and insuring a constant curvature of the bending section 6 by maintaining the interval between the linear members 2. Thus, a large number of guide members 4 arranged in the bending section 6 is desirable. On the other hand, if the linear member 2 is driven to the −Z side in the Z-axis direction, the length of the linear member 2 in the bending section 6 is decreased, and the interval between the guide members 4 is decreased. Thus, the number of guide members 4 is determined such that the guide members 4 are arranged so as not to mechanically interfere with each other. Therefore, when l denotes a length of the bending section 6 before driving, $l_{pmax}$ denotes the maximum driving amount of the linear member 2, $T_t$ is the thickness in the Z-axis direction of the distal member 3, $T_g$ is a thickness in the Z-axis direction of the guide member 4, and $N_g$ is the number of guide members 4 in the bending section 6, respective parameters are desirably designed to establish the following relationship.

$$l - l_{pmax} < T_t + T_g \cdot N_g \tag{11}$$

By fixing the guide members 4 to one of the linear members 2, a constant interval can be maintained between the guide members 4 when the bending section 6 is bent, resulting in improvement of the driving reproducibility of the bending section 6. Also, the curvature within the bending section 6 can be maintained to be constant, and controllability of the posture of the bending section 6 at the driving of the linear members 2 is improved. Further, by maintaining a constant interval between the neighboring guide members 4, the guide members 4 can be prevented from mechanically interfering with each other.

Configuration of Multiple Bending Sections

While the configuration of only one bending section 6 has been provided above, this section provides a configuration including a plurality of bending sections (deforming sections) 6a and 6b.

Figure 6C:
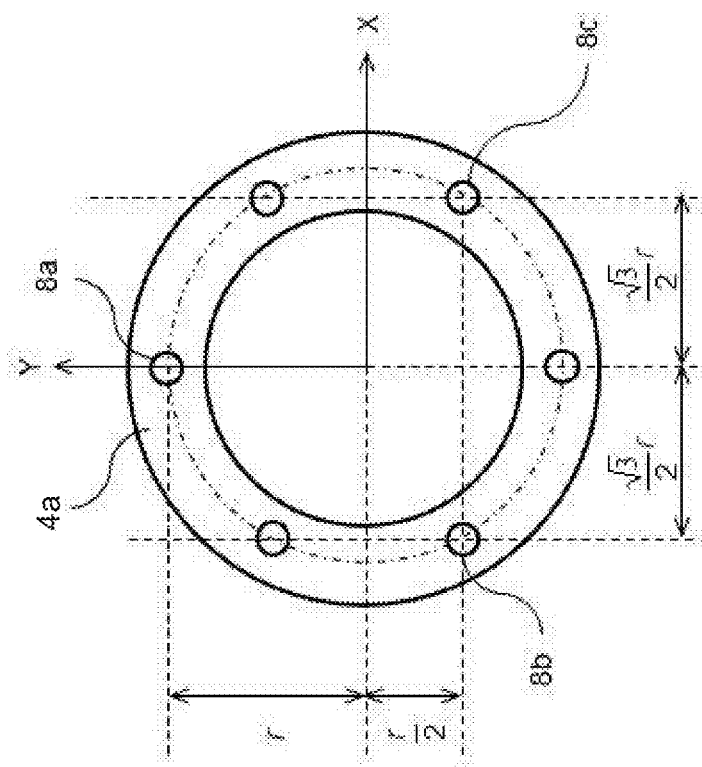
FIGS. 6(b) and 6(c) are plane views of guide members.

In FIG. 6(a), the wire-driven manipulator 1 has distal members 3a and 3b at the distal ends of the respective bending sections 6a and 6b. Two sets of three linear members 2 are coupled to each of the distal members 3a and 3b respectively. Similar in design to the first configuration, guide members 4b have guide holes 8. The holes are arranged to allow the linear members 2 coupled to the distal member 3b to pass through the holes. One of the three linear members 2 is fixed to the guide hole 8, and the remaining two linear members 2 are slidable with respect to the guide holes 8.

Figure 6B:
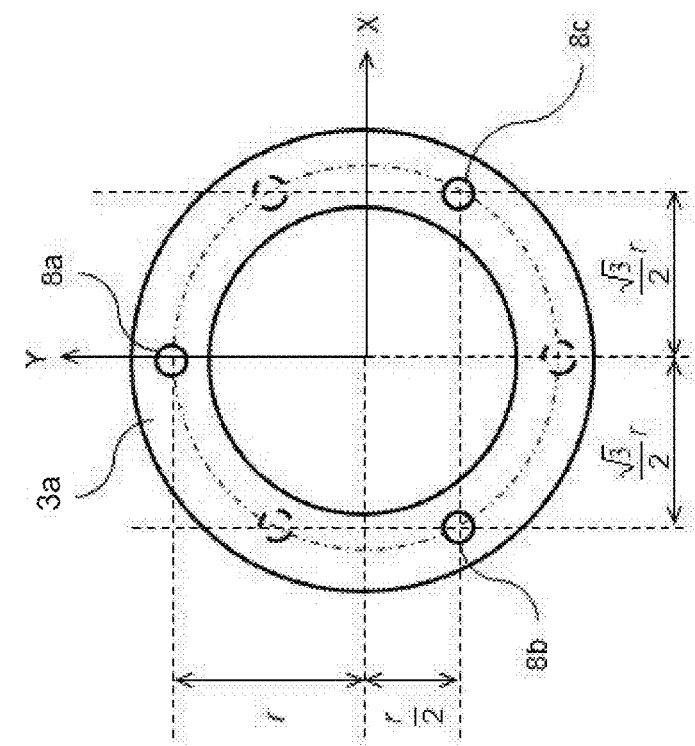

In bending section 6a, the linear members 2 are coupled to the distal member 3a and distal member 3a, shown in FIG. 6(b), has guide holes 8 at positions at which the guide holes 8 do not mechanically interfere with the linear members 2. The guide holes 8 are arranged to allow the linear members 2 coupled to the distal member 3b to be slidable with respect to the guide holes 8. A guide member 4a, shown in FIG. 6(c), has guide holes 8 to allow the linear members 2 coupled to the distal members 3a and 3b to pass through the guide holes 8. The linear members 2 coupled to the distal member 3b are slidable with respect to the guide members 4a. One of the three linear members 2 coupled to the distal member 3a is fixed to the guide hole of the guide member 4a, and the remaining two linear members 2 are slidable with respect to the guide holes 8.

A support member 5 has through holes to allow all the linear members 2 to be slidable with respect to the through holes. The linear members 2 are coupled to drivers 7 (not shown) at terminal ends on the side opposite to the distal members 3 and can be independently driven. By driving at least two of the three linear members 2 coupled to each of the distal members 3a and 3b, the bending sections 6a and 6b can be bent in a desirable plane containing the Z-axis. As in the previous configuration, one of the linear members 2 may be fixed in the driver 7 without being driven.

Driving of the wire-driven manipulator including the plurality of bending sections 6a and 6b is described next.

If the linear members 2 coupled to the distal member 3a are not driven and the linear members 2 coupled to the distal member 3b are driven, the posture of the distal member 3a is not changed, since the shape of the bending section 6a is restrained by the linear members 2 coupled to the distal member 3a, and only the shape of the bending section 6b is changed. The posture of the distal member 3b is determined by the driving amounts of the linear members 2 coupled to the distal member 3b. The change in posture in this case is similar to the description in the first configuration.

In contrast, if only the linear members 2 coupled to the distal member 3a are driven, the linear members 2 coupled to the distal member 3b slide in the bending section 6a, thus the driving does not affect the posture of the distal member 3b, and the posture of the distal member 3a can be controlled similarly to the case in the first configuration. Also, since the distal member 3b is restrained by the linear member 2 coupled to the distal member 3b, the posture of the distal member 3b is not changed.

While the case of driving the linear members 2 coupled to one of the distal members 3a and 3b has been described above, if all linear members 2 are driven, the postures of the respective distal members 3a and 3b may be independently determined in accordance with the driving amounts of the linear members 2 coupled to the distal members 3a and 3b.

By fixing the guide members 4b to the linear member 2 coupled to the distal member 3b, mechanical interference between the guide members 4b and the distal member 3a can be prevented from occurring, and generation of a reactive force between the bending section 6a and the bending section 6b can be restricted. Consequently, driving accuracy when the respective bending sections 6 are independently driven can be improved.

Configuration of Plural Bending Sections with Different Lengths

While the configuration of the wire-driven manipulator having the bending sections 6 with the same length has been provided in the two previous sections, this section provides a configuration in which a wire-driven manipulator has a plurality of bending sections 6 with different lengths.

In FIG. 7(a), the wire-driven manipulator has three bending sections 6a, 6b, and 6c. Linear members 3a, 3b, and 3c, and guide members 4a, 4b, and 4c are respectively arranged in the bending sections 6a, 6b, and 6c. Three sets of three linear members 2 are coupled to each of the linear members 3a, 3b, and 3c respectively.

The linear members 2 coupled to each of the distal members 3 are arranged at the respective vertices of a regular triangle having the median point at the center of the distal member 3. As shown in FIG. 7(b), the linear members 2 being nine in total are arranged with a phase difference of 40° about the center of the distal members 3a, 3b, and 3c. In this configuration, the bending sections 6 are three sections. If the bending sections 6 are N sections, the number of linear members 2 is 3×N in total. The phase difference of the linear members 2 may be 120/N degrees, and a combination of the linear members 2 that form a regular triangle may be coupled to each of the distal members 3. Also, the linear members 2 of the respective bending sections 6 may be arranged by shifting the phase clockwise or counterclockwise by 120/N degrees in the arrangement order of the neighboring bending sections 6. Further, the linear members 2 fixed to the guide members 4 may be arranged by shifting the phase clockwise or counterclockwise by 120/N degrees in the arrangement order of the neighboring bending sections 6.

The lengths of the bending sections 6 may be determined in accordance with the desired use of the wire-driven manipulator 1, and the lengths of the bending sections 6 may be different from one another. As it is found from Expressions (5) and (10) in the first configuration, the posture of each of the distal members 3 is determined by the distance r of the linear member 2 from the center of the guide member 4, and the driving amount 1 in the Z-axis direction of the linear member 2. The posture of each distal member 3 does not depend on the length of the corresponding bending section. The configuration shown in FIG. 7(a) has a structure in which the bending sections 6b and 6c are shorter than the bending section 6a. In this case, the posture of the wire-driven manipulator 1 can be controlled more finely at the distal end. Also, the guide members 4 are only required to be arranged at the interval that satisfies the relationship in Expression (11) on a bending section 6 basis. The arrangement may vary among the bending sections 6. Also, if spring elements or the like are arranged between the guide members 4 to maintain the interval between the guide members 4, the interval and the spring elements are required to be designed in accordance with the length of the bending section 6. Accordingly, since the guide members 4 are fixed to the linear member 2, the design may be made without depending on the length of the bending section 6. Also in the third configuration, not all the drivers 7 coupled to the linear members 2 are driven. One or two drivers 7 may be driven for each of the bending sections in accordance with the required degree of freedom.

Modeling—In this section, kinematics in the X-Z plane of a continuum robot are derived.

Definition of symbols for equations provided below: $l_n$: a length of an n-th bending section, $r_n$: a displacement from guide holes 8a, 8b, and 8c of a guide member 4 of the n-th bending section to the center of the guide member 4, e: the number of bending sections of a robot, $\theta_n$: an angle of a distal end of the n-th bending section, $\theta_{refn}$: a target angle of the distal end of the n-th bending section, $l_{pn}$: a driving displacement of a wire of the n-th bending section, $x_{tn}$, $z_{tn}$: coordinates of the distal end of the n-th bending section, c: the total number of evaluation points of the robot, $x_i$, $z_i$: i-th coordinates when the robot is divided into a number c in the longitudinal direction, and $z_b$: a base displacement.

Figure 8:
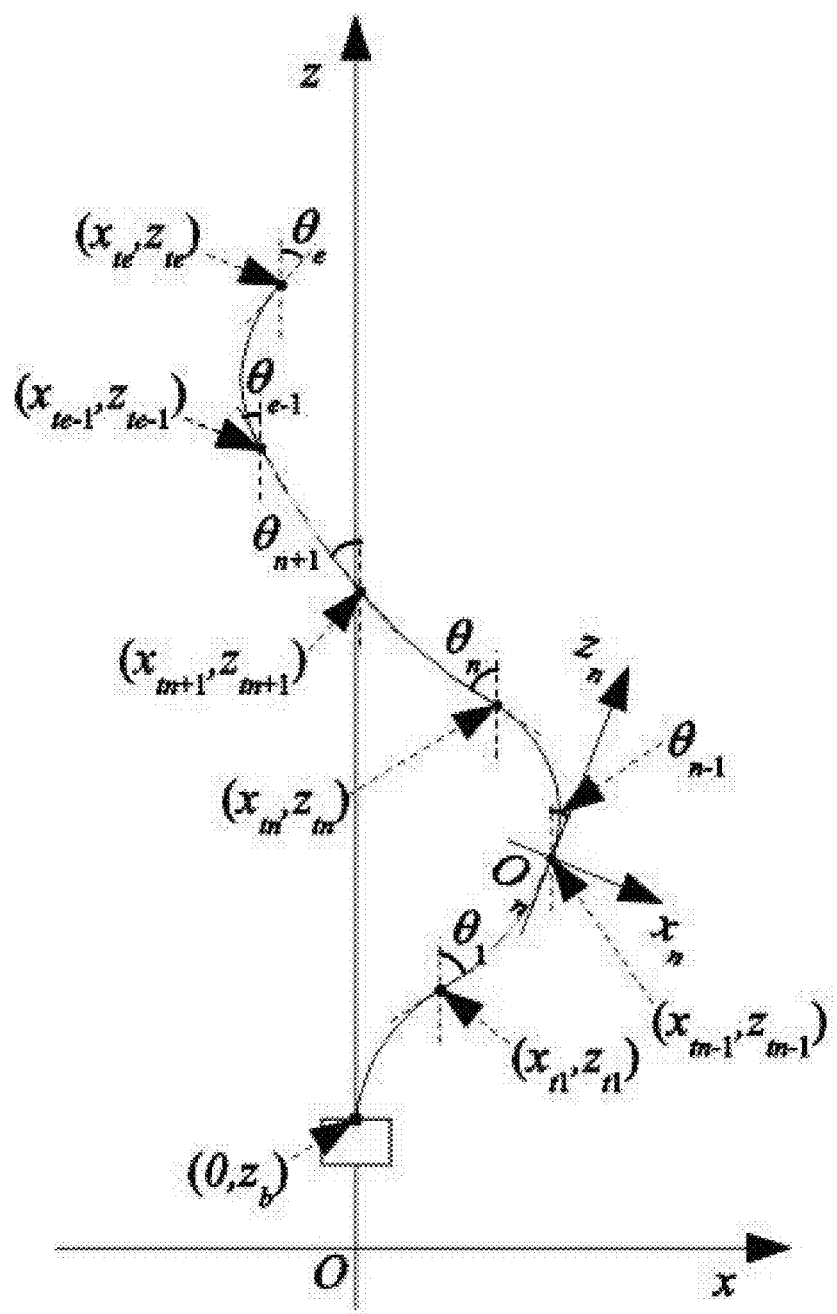
FIG. 8 illustrates a kinetic model according to a first embodiment.
Figure 9:
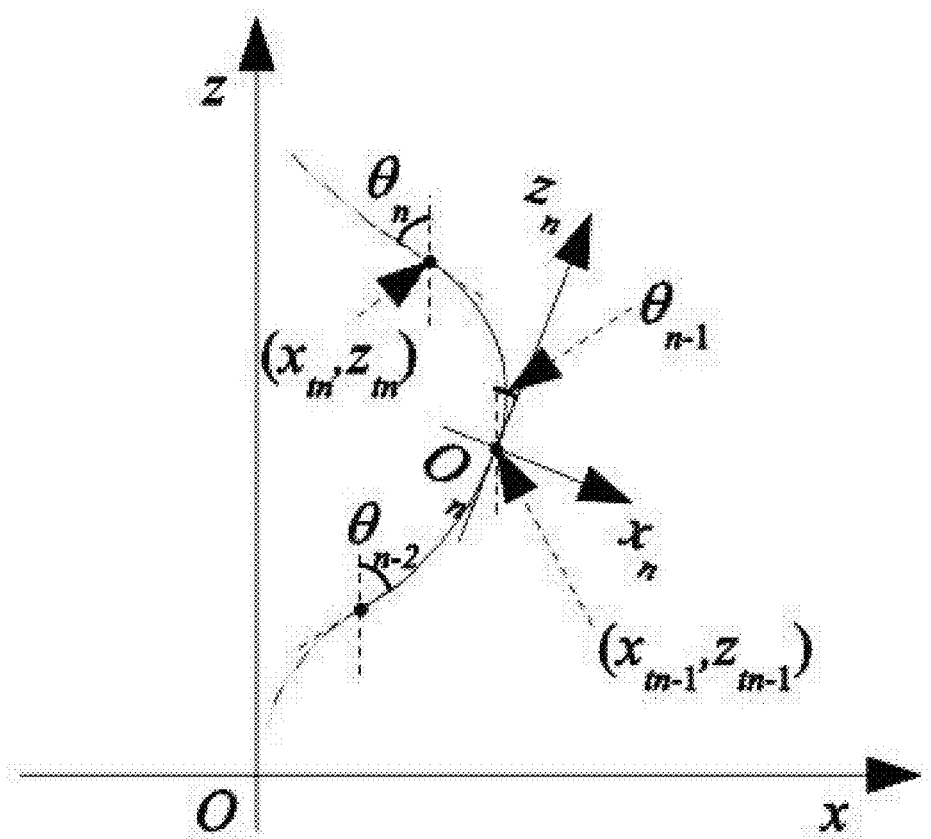
FIG. 9 illustrates a kinetic model according to the first embodiment.

Kinematics, shown in FIG. 8, of the continuum robot in which the number of bending sections is n, are derived based on the following assumptions:
1. A wire is deformed only in a paper plane.
2. The wire is deformed with a constant curvature in each bending section.
3. Twisting deformation of the wire is not considered.
4. The wire is not deformed in the longitudinal direction.

First, Expression (5) becomes the following expression:

$$l_{p1} = \tfrac{3}{2} r_1 \theta_1 \tag{12}$$

Then, the relationship between the wire driving displacement $l_{pn}$ and the angle $\theta_n$ of the distal end of the n-th bending section is derived. In this case, it is assumed that n is 2 or larger. A bending relative angle of the n-th bending section, which is denoted as $\tilde{\theta}_n$ is defined as follows:

$$\tilde{\theta}_n = \theta_n - \theta_{n-1} \tag{13}$$

Then, when $x_{m-1}$, $z_{m-1}$ denote the origin, and a relative coordinate system $x_n$-$z_n$ in a $\theta_{n-1}$ direction and the direction orthogonal to that direction is plotted as shown in FIG. 8, the relationship between the driving displacement of the wire in the relative coordinate system $x_n$-$z_n$, which is denoted as $\tilde{l}_{pn}$ and the angle of the distal end of the first bending section, which is denoted as $\tilde{\theta}_n$ is expressed as follows:

$$\tilde{l}_{pn} = \tfrac{3}{2} r_n \tilde{\theta}_n \tag{14}$$

The wire driving displacement $l_{pn}$ of the n-th bending section is the sum total of displacements of wires for driving the n-th bending section in the relative coordinate system from the first to (n−1)th sections. The sum total is expressed as follows:

$$l_{pn} = \tfrac{3}{2} r_n (\tilde{\theta}_n + \tilde{\theta}_{n+1} + \ldots + \theta_1) = r_n \theta_n \tag{15}$$

Accordingly, it is found that the angle $\theta_n$ of the distal end of the n-th bending section is determined only on the basis of the wire driving displacement $l_{pn}$, and the angle $\theta_n$ does not depend on the angle of the midway bending section.

Next, the relationship between the distal end angle and the distal end coordinates of the n-th bending section is derived. The first bending section is considered as follows:

$$x_{t1} = \frac{l_1}{\theta_1}(1 - \cos \theta_1) \tag{16}$$

$$z_{t1} = \frac{l_1}{\theta_1} \sin \theta_1 \tag{17}$$

Then, the relationship between the distal end angle and the distal end coordinates of the n-th bending section is derived. In this case, it is assumed that n is 2 or larger. The coordinates of the distal end of the bending section in the relative coordinate system $x_n$-$z_n$, which are denoted as $\tilde{x}_{tn}$ and $\tilde{z}_{tn}$ are expressed as follows:

$$\tilde{x}_{tn} = \frac{l_n}{\tilde{\theta}_n}\left(1 - \cos \tilde{\theta}_n\right) \tag{18}$$

$$\tilde{z}_{tn} = \frac{l_n}{\tilde{\theta}_n} \sin \tilde{\theta}_n \tag{19}$$

Accordingly, the coordinates $x_{tn}$, $z_{tn}$ of the distal end in the absolute coordinate system are obtained as follows by using rotation transformation matrix.

$$\begin{bmatrix} x_{tn} \\ z_{tn} \end{bmatrix} = \begin{bmatrix} x_{t1} \\ z_b + z_{t1} \end{bmatrix} + \sum_{m=2}^{n} \begin{bmatrix} \cos \theta_{m-1} & \sin \theta_{m-1} \\ -\sin \theta_{m-1} & \cos \theta_{m-1} \end{bmatrix} \begin{bmatrix} \frac{l_m}{\tilde{\theta}_m}(1 - \cos \tilde{\theta}_m) \\ \frac{l_m}{\tilde{\theta}_m} \sin \tilde{\theta}_m \end{bmatrix} \tag{20}$$

Also, in the next term, the coordinates for dividing the entire robot into α times are used as evaluation points for an optimization algorithm. At this time, the total number of evaluation points is c=αe. The coordinates $x_i$, $z_i$ of an i-th evaluation point are obtained as follows.

$$\begin{bmatrix} x_i \\ z_i \end{bmatrix} = \begin{bmatrix} \dfrac{l_1}{\left(\dfrac{R}{\alpha}\right)\theta_1}\left(1-\cos\left(\dfrac{R}{\alpha}\right)\theta_1\right) \\ \dfrac{l_1}{\left(\dfrac{R}{\alpha}\right)\theta_1}\sin\left(\dfrac{R}{\alpha}\right)\theta_1 \end{bmatrix} + \begin{bmatrix} 0 \\ z_b \end{bmatrix} \quad (i < \alpha) \tag{21}$$

$$\begin{bmatrix} x_i \\ z_i \end{bmatrix} = \sum_{n=1}^{Q} \begin{bmatrix} x_{tn} \\ z_{tn} \end{bmatrix} \quad (i = n\alpha)$$

$$\begin{bmatrix} x_i \\ z_i \end{bmatrix} = \sum_{n=1}^{Q} \begin{bmatrix} x_{tn} \\ z_{tn} \end{bmatrix} +$$

$$\begin{bmatrix} \cos\theta_Q & \sin\theta_Q \\ -\sin\theta_Q & \cos\theta_Q \end{bmatrix} \begin{bmatrix} \dfrac{l_{Q+1}}{\left(\dfrac{R}{\alpha}\right)\theta_{Q+1}}\left(1-\cos\left(\dfrac{R}{\alpha}\right)\bar{\theta}_{Q+1}\right) \\ \dfrac{l_{Q+1}}{\left(\dfrac{R}{\alpha}\right)\theta_{Q+1}}\sin\left(\dfrac{R}{\alpha}\right)\bar{\theta}_{Q+1} \end{bmatrix} +$$

$$\begin{bmatrix} 0 \\ z_b \end{bmatrix} \quad (i = n\alpha+1, \ldots, n\alpha+\alpha-1)$$

In this case, Q, R are a quotient and a remainder, and are obtained from Q=[i/α], R=i mod α.

Control System Design

Figure 10:
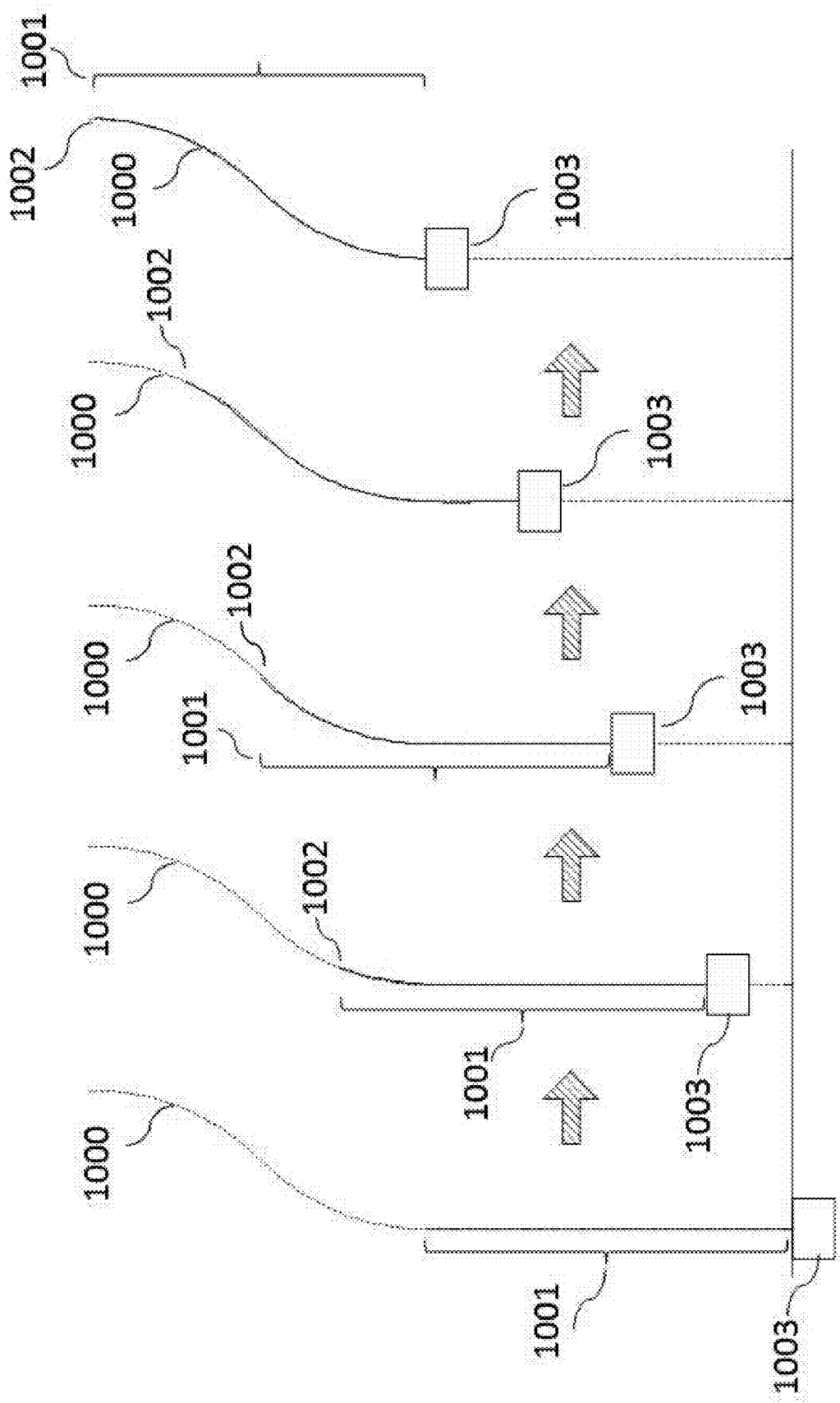
FIG. 10 illustrates leader following control according to the first embodiment.

A leader following control system is described next. As shown in FIG. 10, leader following control is a method of control to allow a following bending section to pass through the same path as a path 1000 through which a bending section at the most distal end 1002 passes. Accordingly, the continuum robot 1001 can advance in the space by weaving through the space. In the leader following control, the path 1000 does not have to be previously determined, and the bending angle of the most distal end 1002 may be continuously propagated to the following bending section by a bending section length. With this method, when a manipulator gives a command including the bending angle of the most distal end 1002 and the advancement amount of the base 1003, the manipulator can perform the leader following control in real time on the continuum robot 1001. Commands can be given by using, for example, a joystick.

First Leader Following Control Method

Figure 11:
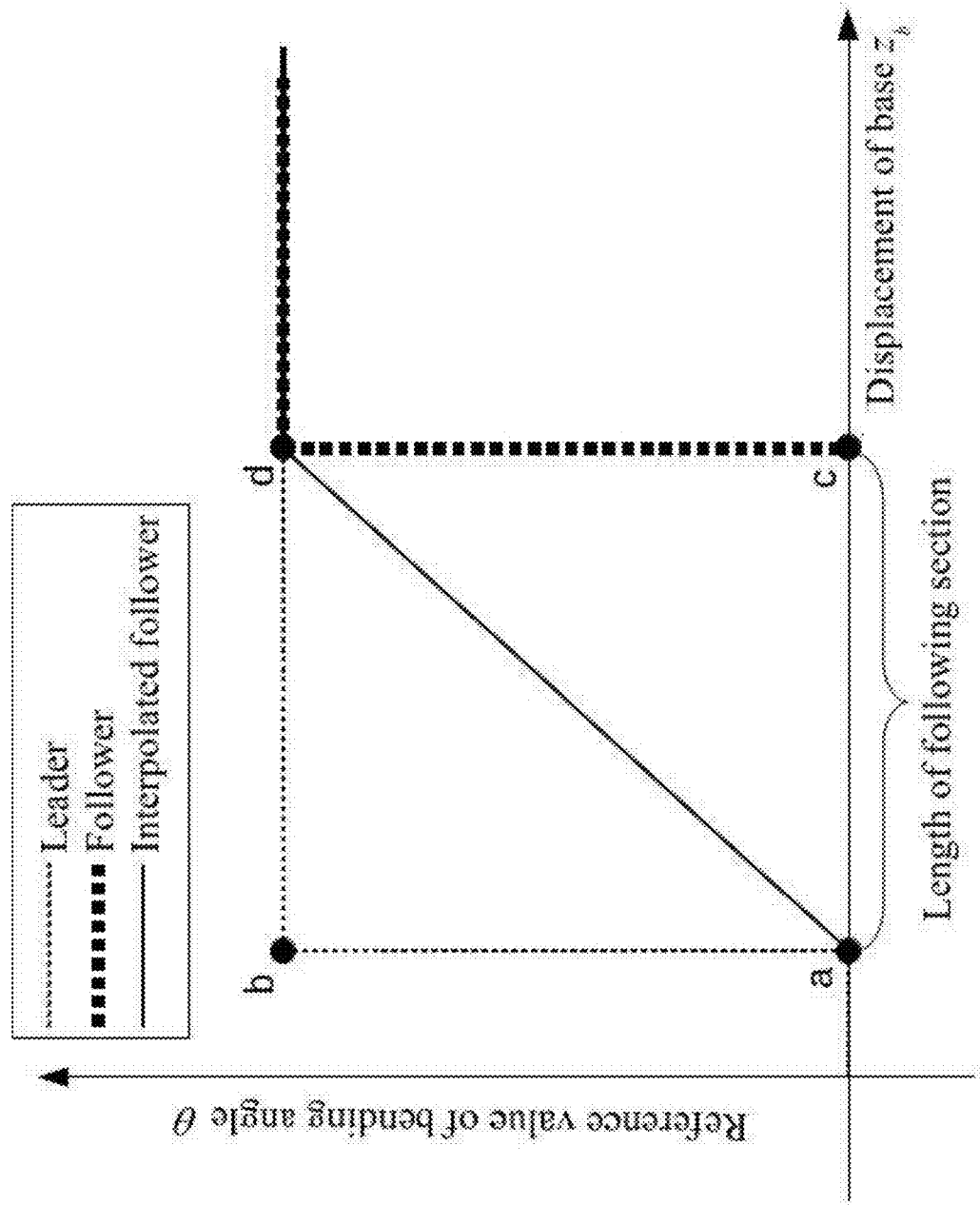
FIG. 11 illustrates a control system according to the first embodiment.

FIG. 11 shows a graph in which the horizontal axis plots the base displacement $z_b$, and the vertical axis plots the bending angle θ. The broken line indicates a bending command to the most distal end by the manipulator, and the thick broken line indicates a bending command to the following bending section. At the base displacement a, if the bending command of angle ab is given by the manipulator, the bending command angle to be applied to the following bending section may be automatically generated such that the bending angle becomes cd at the base displacement c. In this case, the base displacement c is determined such that the distance ac becomes the following bending section length l. Then, the bending angle command values to be applied to the following bending section are stored as a table in a storage unit of a control apparatus, and is read out and applied in accordance with the base displacement. If the number of following bending sections is 2 or larger, the following bending section in the above description is replaced with the most distal end, and the processing is continuously performed. Accordingly, bending angle command values for all bending sections can be obtained.

However, in the above description, the bending angle of the follower is not changed when the base displacement is between a and c. The bending angle command rises at the base displacement c, and thus the continuum robot reacts abruptly. Therefore, in this embodiment, the bending angle command of the following bending section is interpolated such that the point a is connected to the point d. The solid line in FIG. 11 shows the interpolated bending angle command to the following bending section. In this embodiment, the bending angle command generation algorithm is called first leader following control method.

Second Leader Following Control Method

Figure 12A:
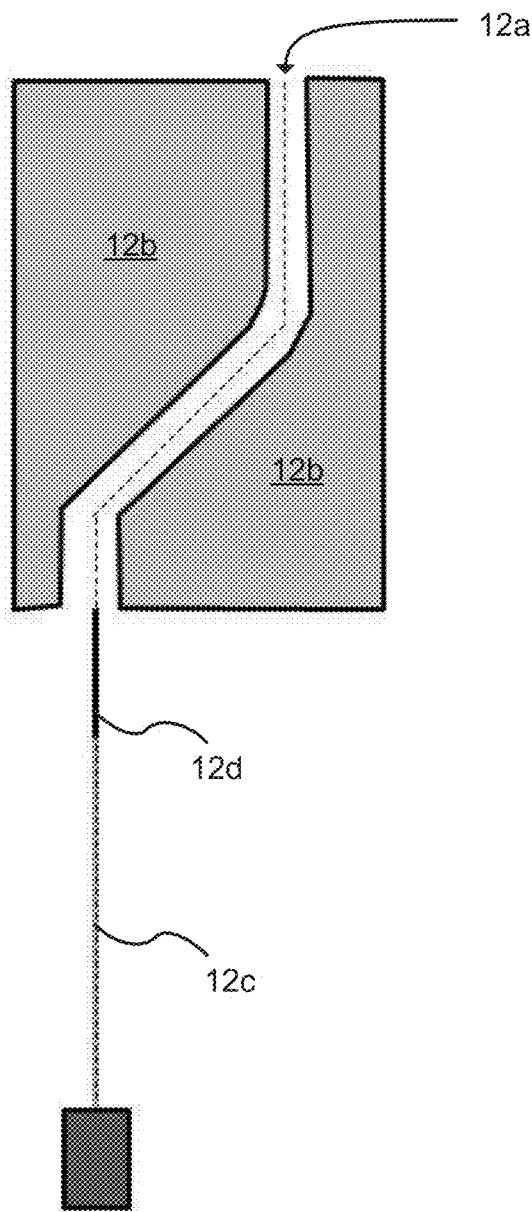
FIGS. 12(a) and 12(b) illustrate leader following control according to the first embodiment.
Figure 12B:
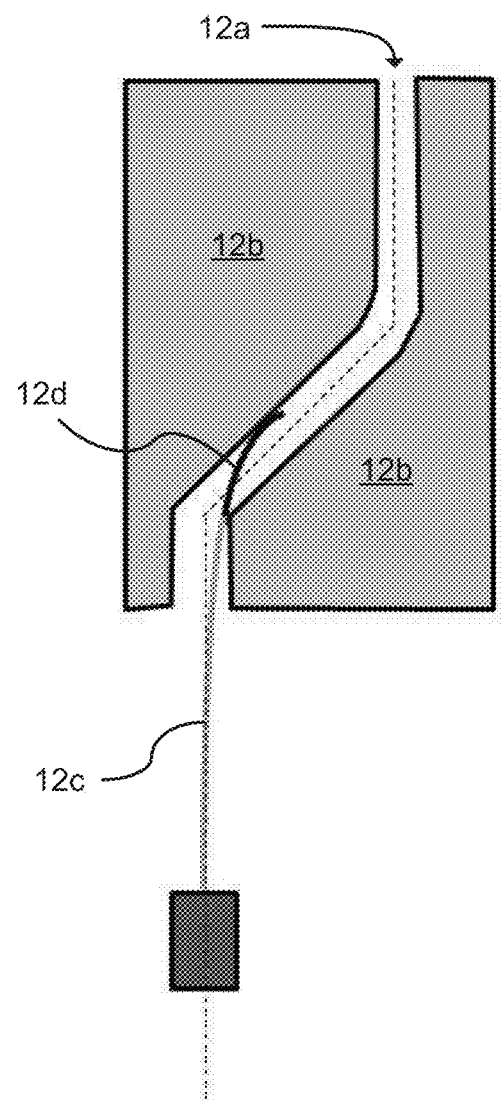

When the first leader following control method described in the above section is applied to a path 12a in a narrow space surrounded by obstacles 12b as shown in FIG. 12(a) for example, a contact may likely occur with respect to the peripheral obstacles 12b as shown in FIG. 12(b). In FIG. 12(b), the bending angle of the following section 12c is small, and thus, the following section 12c contacts the inner side of the path entrance, and the leading section 12d contacts the outer side of the path. As described earlier, in the continuum robot according to this disclosure, the angle of the distal end of each bending section is determined only by the displacement of the driving wire. If the servo stiffness of the displacement control system for driving wires is high, even if a contact occurs with respect to an obstacle in the periphery, the angle of the distal end of the bending angle is obtained. Thus, if the base advances while the bending angle of the follower is small, the portion around the distal end of the bending section is largely deformed. This may cause 1) a problem in which the friction increases as the vertical normal force with respect to an obstacle increases, and the continuum robot may have trouble advancing, and 2) a problem in which the possibility of breakage of the continuum robot increases. Also, this problem becomes noticeably apparent when the bending section length of the follower is longer than the bending section length of the leader.

Figure 13:
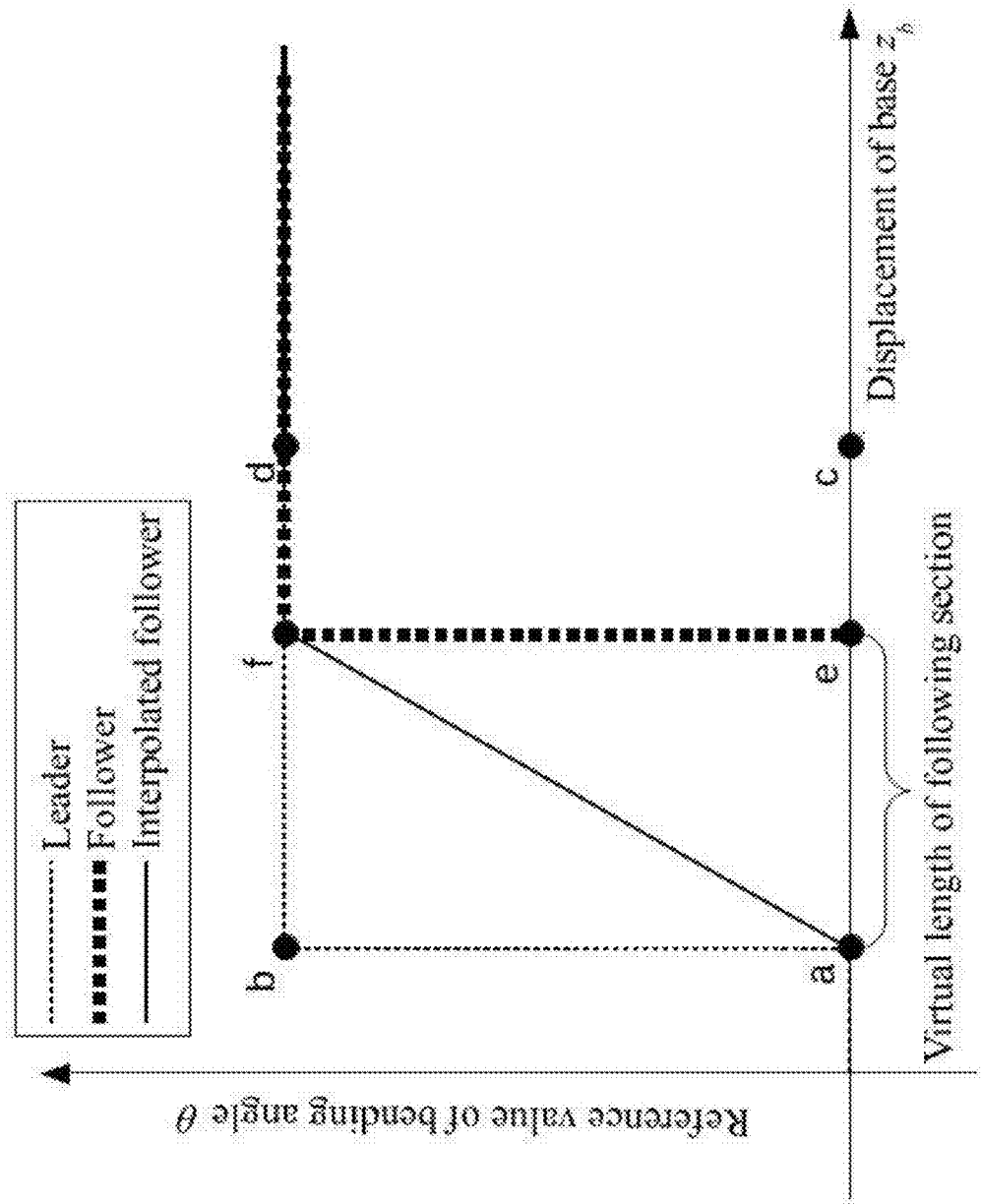
FIG. 13 illustrates a control system according to the first embodiment.

Thus, in this embodiment, a second leader following control algorithm is created as shown in FIG. 13. The solid line, the thick broken line, and the broken line respectively indicate the bending angle command after interpolation, the bending angle command before interpolation, and a command by the manipulator similar to FIG. 11. In the second leader following control method, the base displacement e at which the bending angle command of the follower rises is determined such that the distance ae is shorter than the actual bending section length l. The distance ae is called virtual bending section length. Accordingly, the command is given to the bending angle of the follower to further approach the bending angle of the leader. The contact, as shown in FIG. 12(b), is less likely to occur, and the advancement in the path of the narrow space is more easily provided.

Figure 14:
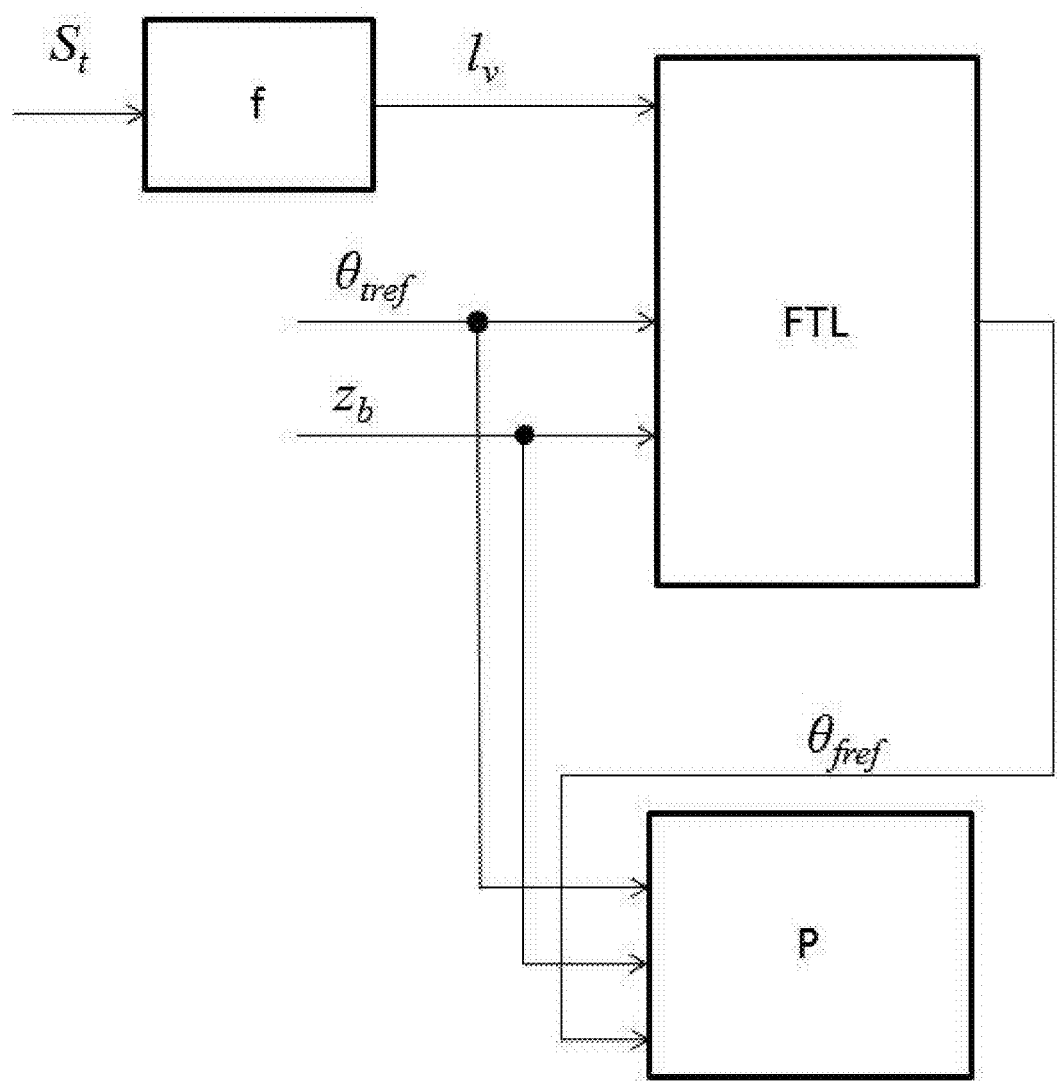
FIG. 14 is a block diagram showing a control system according to the first embodiment.
Figure 15:
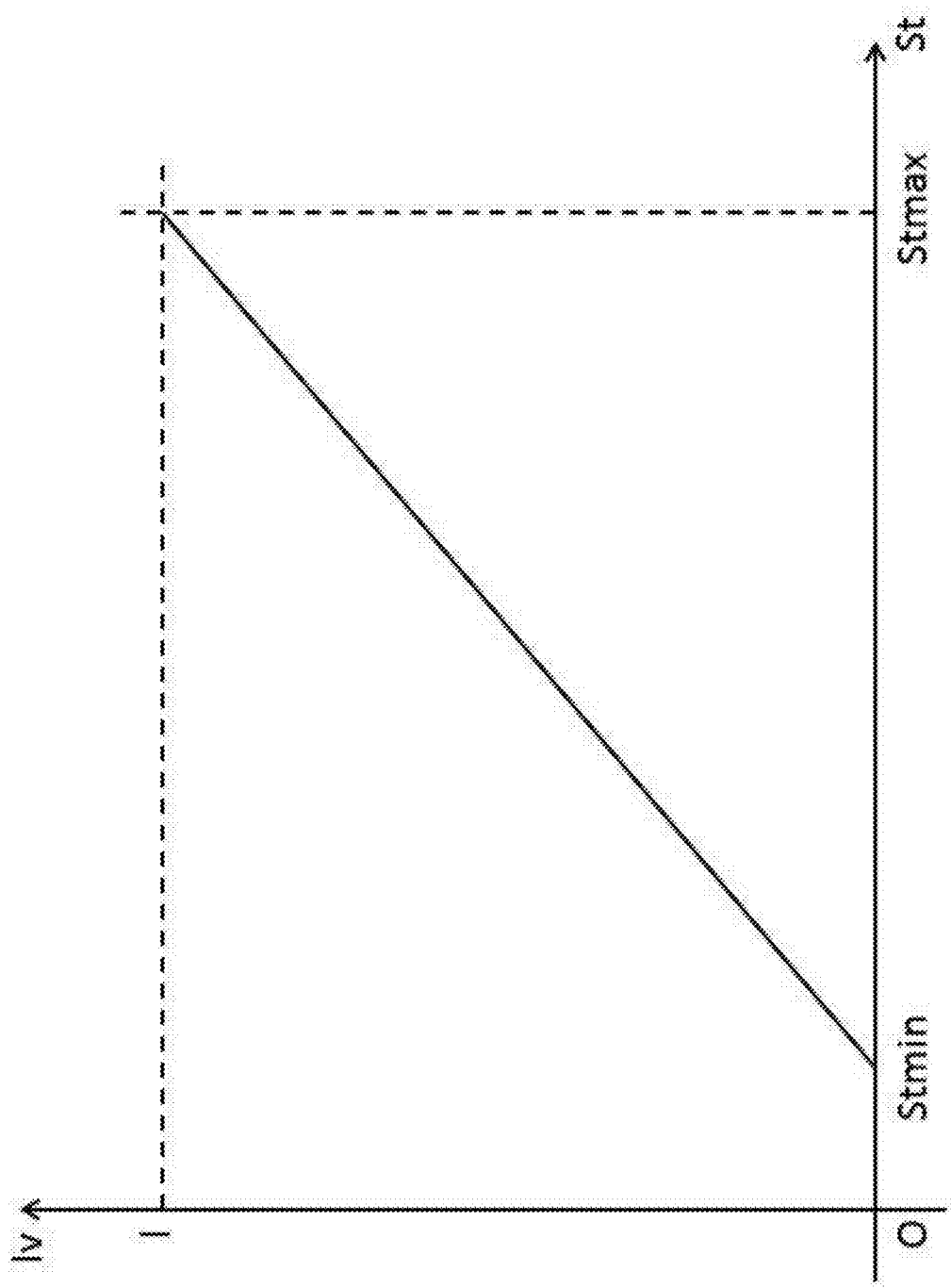
FIG. 15 illustrates a control graph according to the first embodiment.

FIG. 14 is a block diagram. In this case, P denotes a control object, FTL denotes a second leader following control algorithm, $l_v$ denotes a virtual bending section length vector, $\theta_{tref}$ denotes a bending angle command value of the most distal end, $\theta_{fref}$ is a bending angle command vector of the most distal end, $z_b$ is a base displacement command value, $S_t$ denotes a cross-sectional area of the periphery of a path, and f denotes a transformation table. For an example of a transformation table, when $W_d$ denotes a diameter of each of the guide members and the distal members, settings as shown in FIG. 15 may be made by using rough minimum and maximum sectional areas $S_{tmin}$ and $S_{tmax}$ that allow passage.

$$S_{tmin} = w_d \sum_{m=1}^{n} l_m \qquad (22)$$

$$S_{tmax} = \frac{\pi}{2}\left(\sum_{m=1}^{n} l_m\right)^2 \qquad (23)$$

Simulation

In this section, simulation is executed by using the leader following control system described in the above section. The simulation is directed to a continuum robot in which the number of bending sections is 2, and the first bending section length is longer than the second bending section length at the most distal end, as shown in FIG. 12. The continuum robot in which the first bending section length is 0.18 m, the second bending section length is 0.02 m, and the number of bending sections is 2 is used, the robot is divided into 200 elements, and the simulation is executed. Also, regarding the mechanical bending limit between the guide members, the relative angle between the elements is set at 10 degrees at maximum.

Figure 16A:
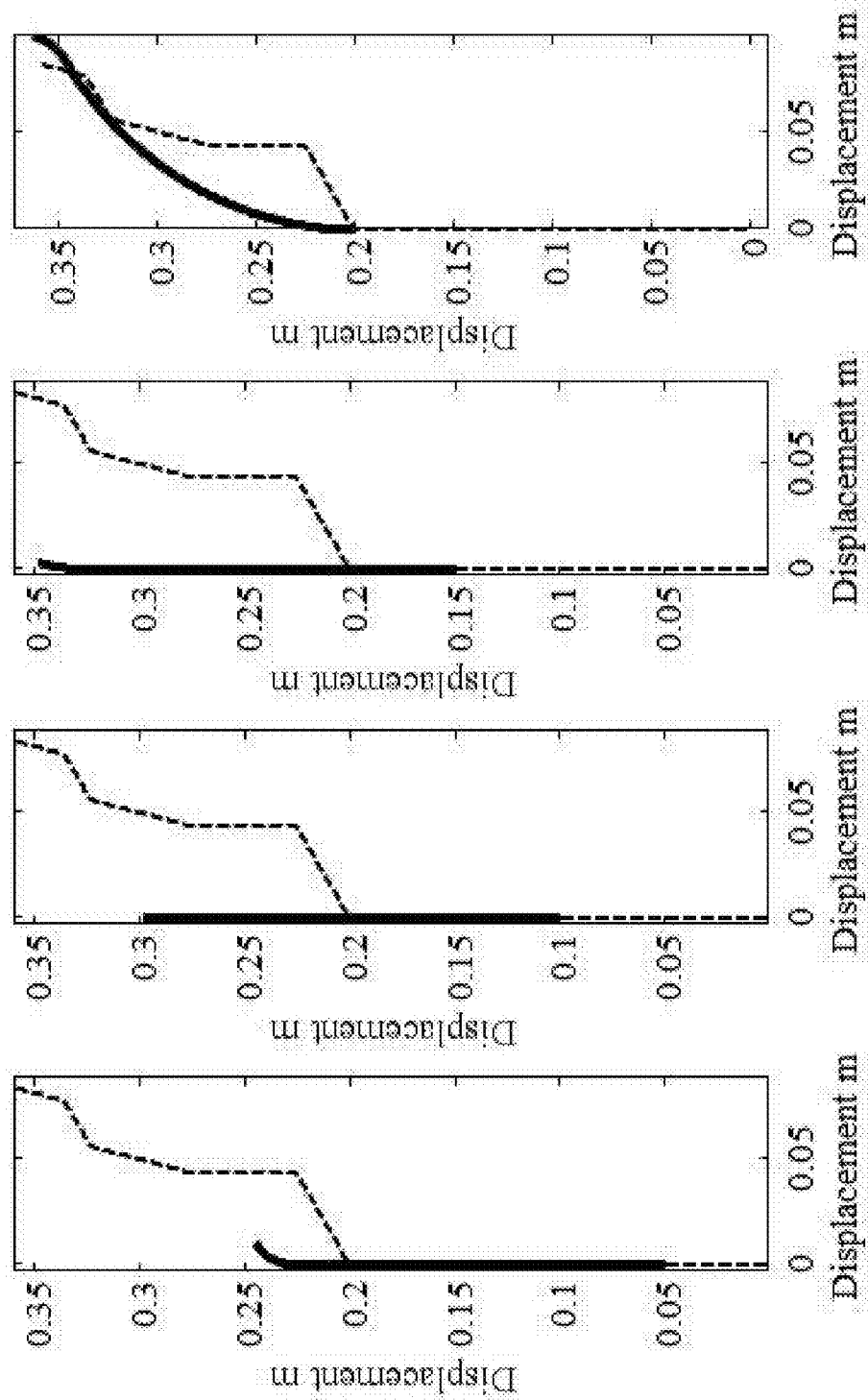
FIGS. 16(a), 16(b), and 16(c) illustrate simulation results according to the first embodiment.
Figure 16B:
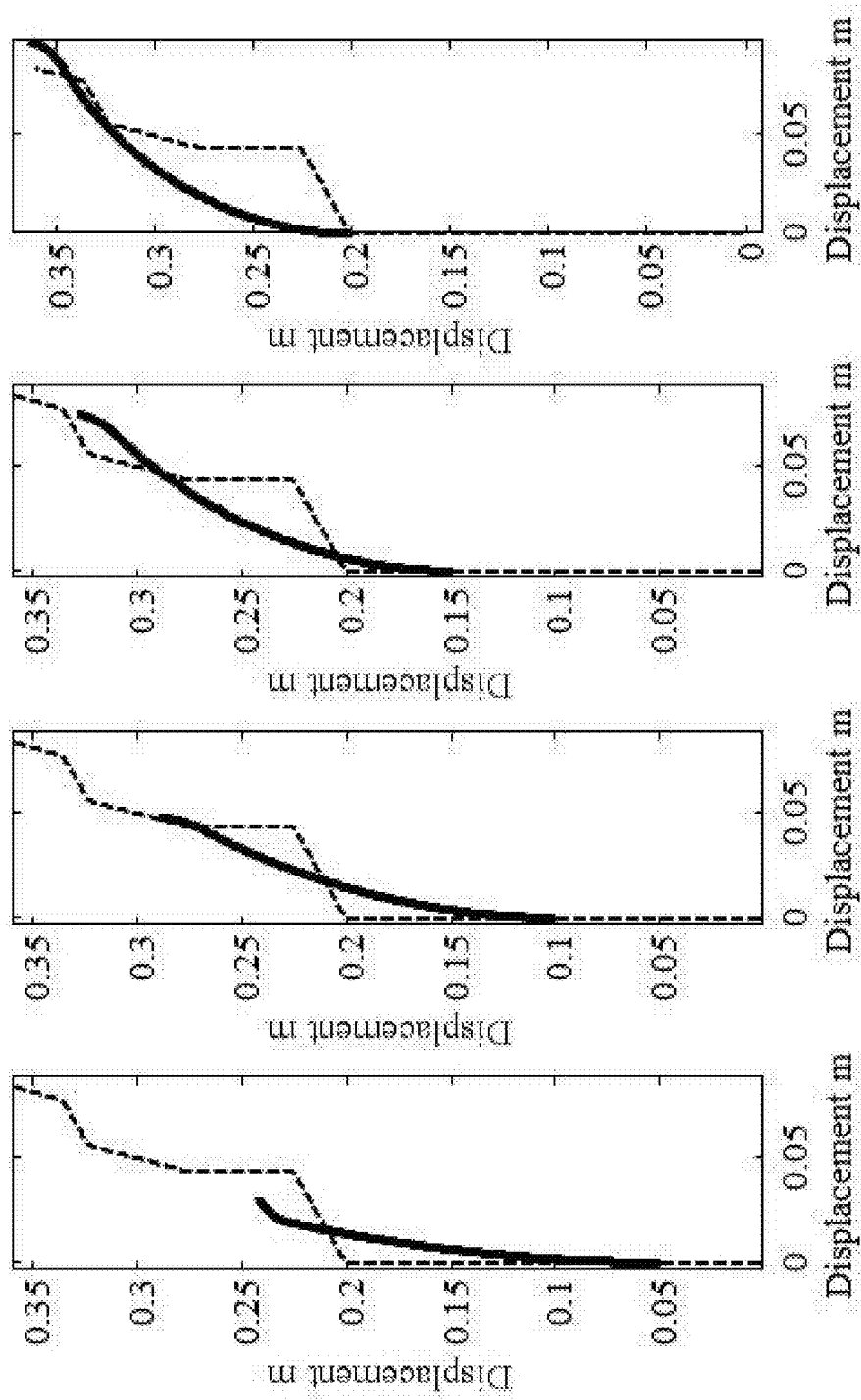
Figure 16C:
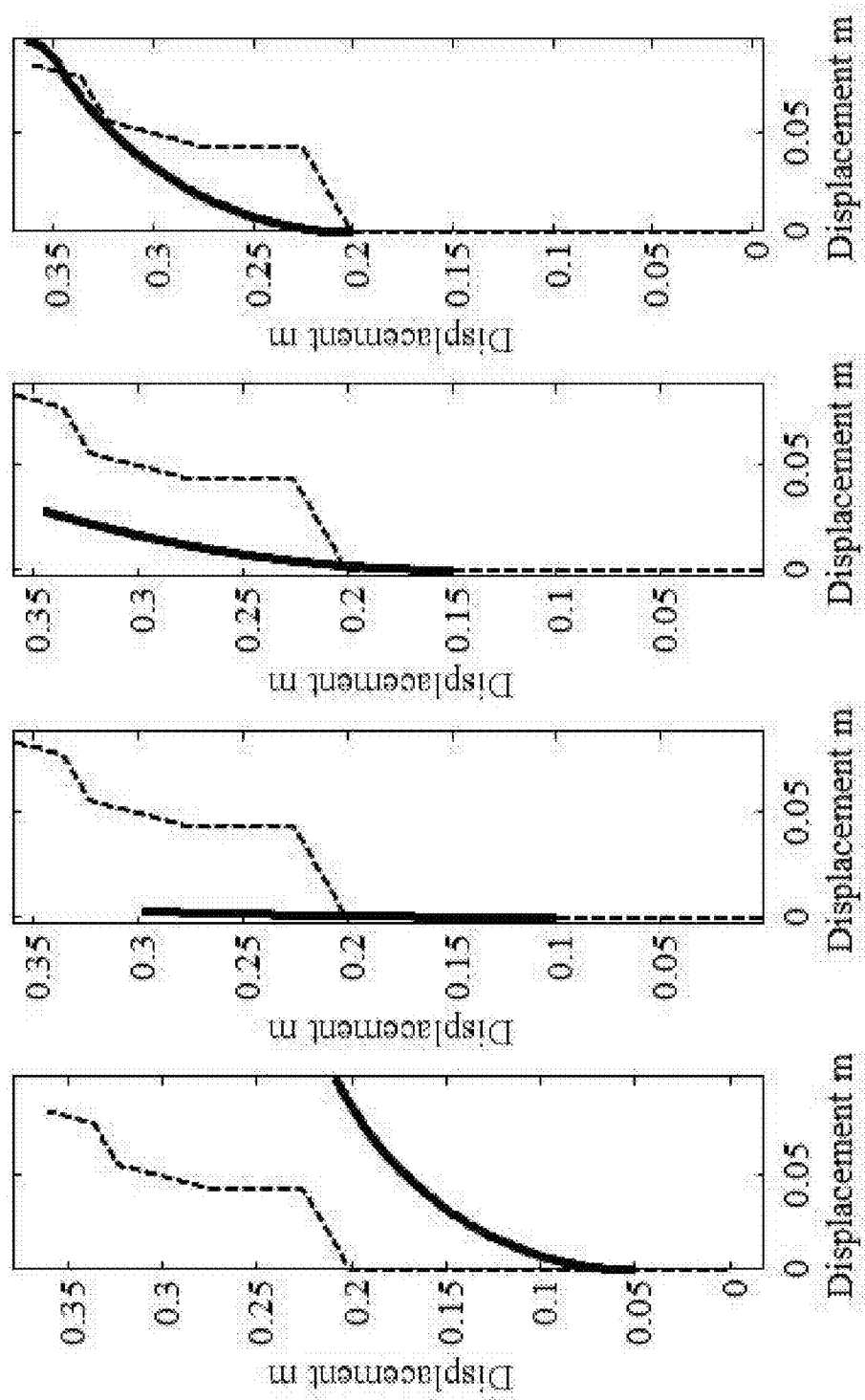

FIG. 16(a) shows a comparative response of the bending angle command generation algorithm in a space without an obstacle in the periphery. The solid line indicates the shape of the continuum robot, and the broken line indicates the target path. FIG. 16(a) shows a control response of a leader following control method without interpolation. Since the bending angle command rises stepwise, it is found that a continuum robot having a long following section makes an abrupt change at the terminal end of the path. FIG. 16(b) shows a control response by the first leader following control method. Since the bending angle command is interpolated, it is found that the advancement can be made almost along the path intended by the manipulator. FIG. 16(c) shows a control response by the second leader following control method. The bending angle command is interpolated, however, the angle of the following section is generated to approach the angle of the leading section. It is found that the leading section is largely fluctuated in the space without an obstacle or the like and the advancement is not provided along the path. This is more noticeable when the following section length is longer.

Next, simulation of advancement in a narrow space in which the periphery of a path is surrounded by obstacles is executed. To predict the shape of a continuum robot in a narrow space, 200 evaluation points, the number of which corresponds to the number of division, are generated on the continuum robot by using Expression (21). The shape is calculated by steepest-descent method such that the evaluation points other than the evaluation points at the distal end of each bending section approach the path without updating the angle of the distal end of the bending section. Accordingly, the restriction on the angle of the distal end of each bending section in accordance with servo stiffness of the driving wires is simulated. Further, with regard to the relative angle between respective elements, if the relative angle exceeds 10 degrees, the relative angle is removed from the update by steepest-descent method. Accordingly, the mechanical bending limitation between the guide members is simulated.

Figure 17A:
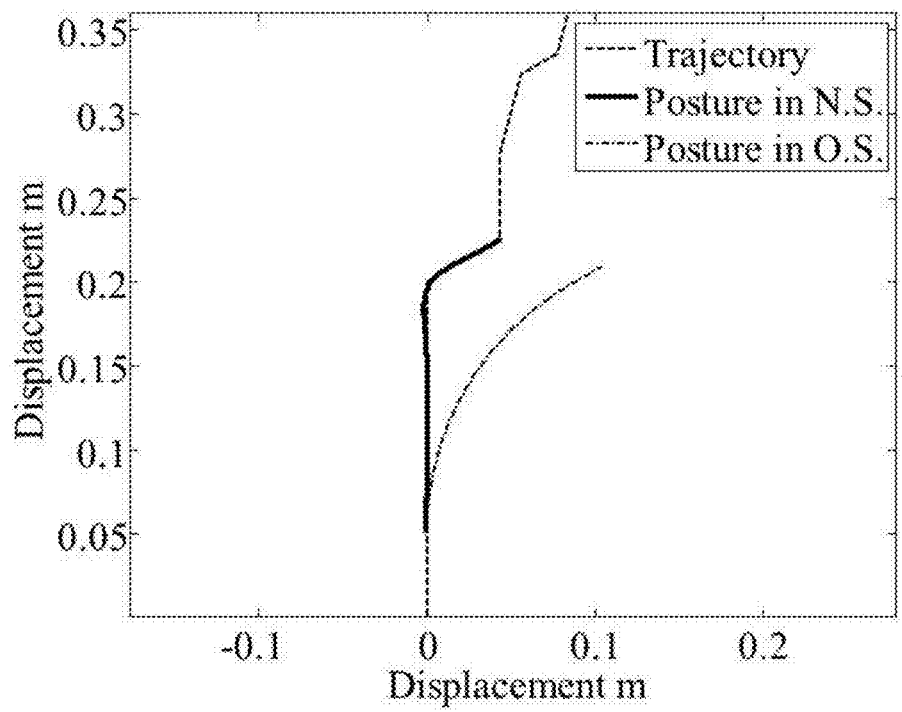
FIGS. 17(a) and 17(b) illustrate simulation results according to the first embodiment.
Figure 17B:
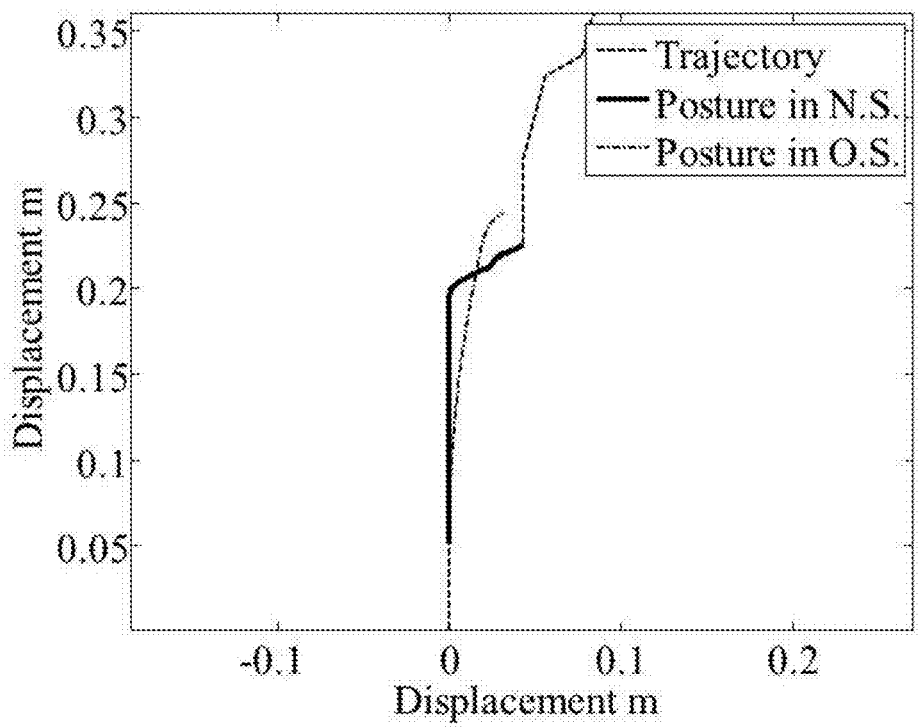
Figure 18A:
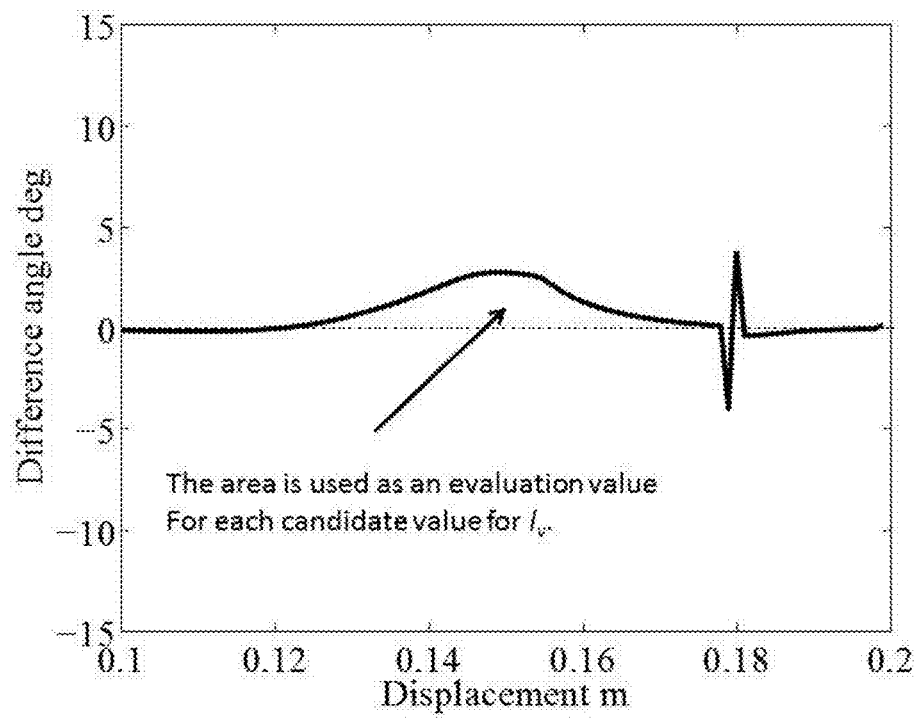
FIGS. 18(a) and 18(b) illustrate simulation results according to the first embodiment.
Figure 18B:
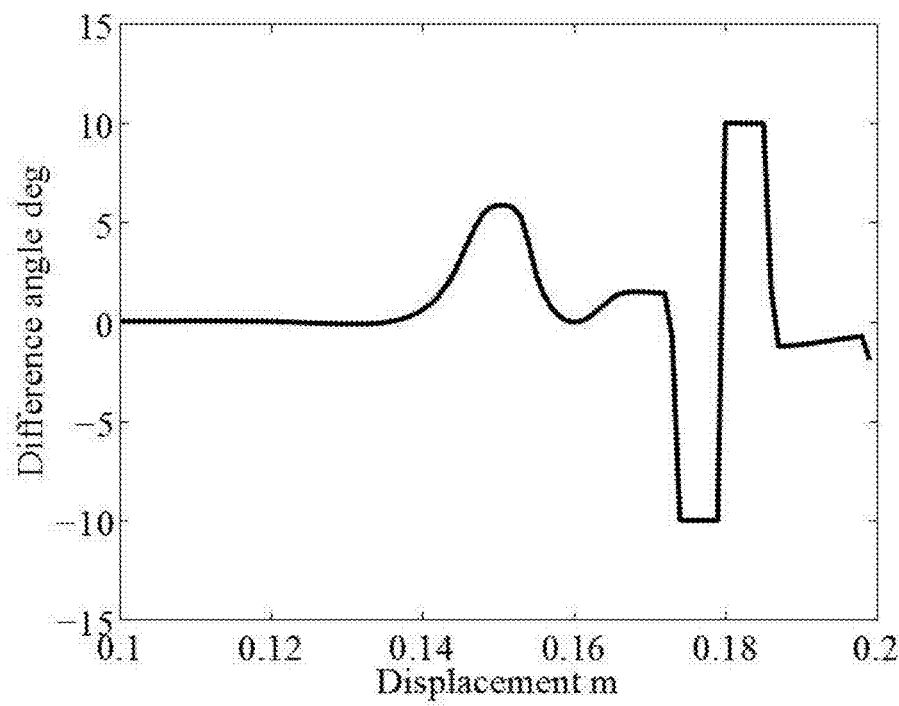

FIGS. 17(a) and (b) show the shape of a continuum robot in a narrow space with base displacement $z_b$=0.051 m. The solid line indicates the shape of the continuum robot, the broken line indicates the path, and the dotted-chain line indicates the shape of the robot in a space without an obstacle at the same base displacement for reference. FIG. 17(a) shows a response by the second leader following control method. FIG. 17(b) shows a response by the first leader following control. In FIG. 17(a), when the second leader following control is used, the difference between the first bending section and the second bending section is small, and thus the shape of the continuum robot advances along the path. It is found that friction with respect to an obstacle is small, and thus the continuum robot is not broken. However, referring to FIG. 17(b), in the first leader following control, the robot shape approaches the path in the space without an obstacle indicated by the dotted-chain line. However, since the angle of the distal end of the first bending section is small, it is found that deformation with a large curvature is generated in the periphery of the distal end of the first bending section. This represents that the friction with respect to the obstacle is large and it may be difficult to make advancement to the path, and that the continuum robot may be likely broken. FIGS. 18(a) and (b) show the distribution of curvatures of the continuum robot with the shape in FIGS. 17(a) and (b). The horizontal axis plots the distance from the proximal end on the continuum robot and the vertical axis plots the curvature. In the response by the second leader following control method shown in FIG. 18(a), the peak of ±5 degrees appears at 0.18 m which is the leading end of the first bending section. However, in the response by the first leader following control method shown in FIG. 18(b), it is found that the curvature is saturated at the maximum curvature set at a position around 0.18 m being the leading end of the first bending section and deformation with a large curvature is generated.

Figure 19A:
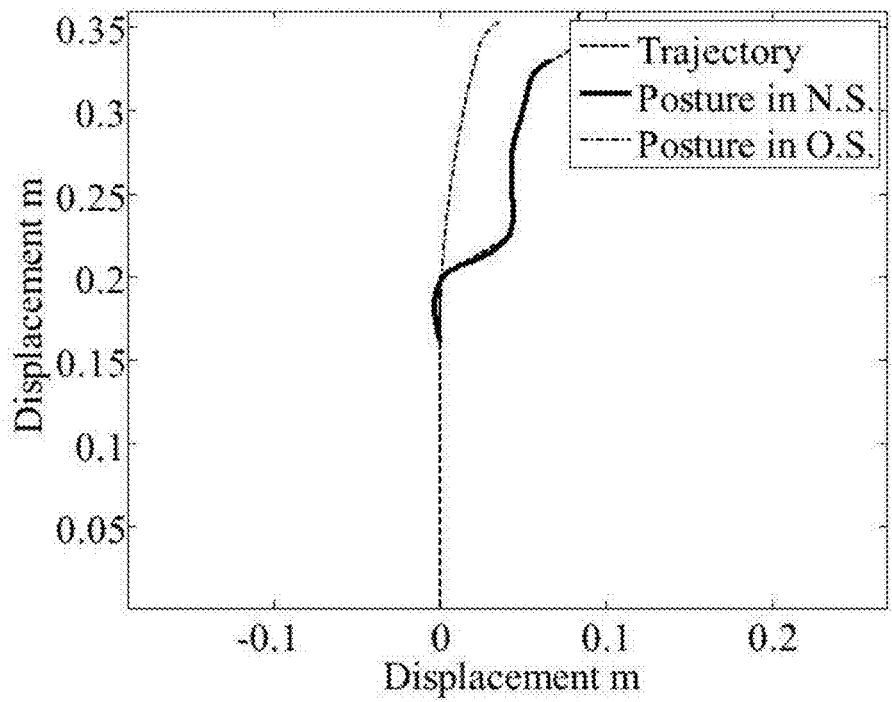
FIGS. 19(a) and 19(b) illustrate simulation results according to the first embodiment.
Figure 19B:
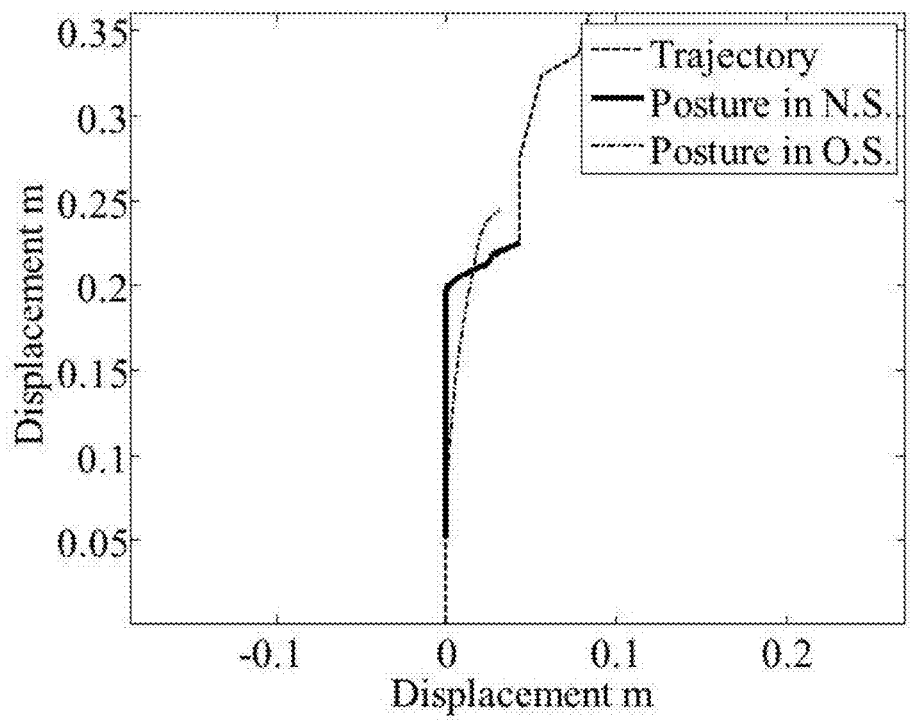
Figure 20A:
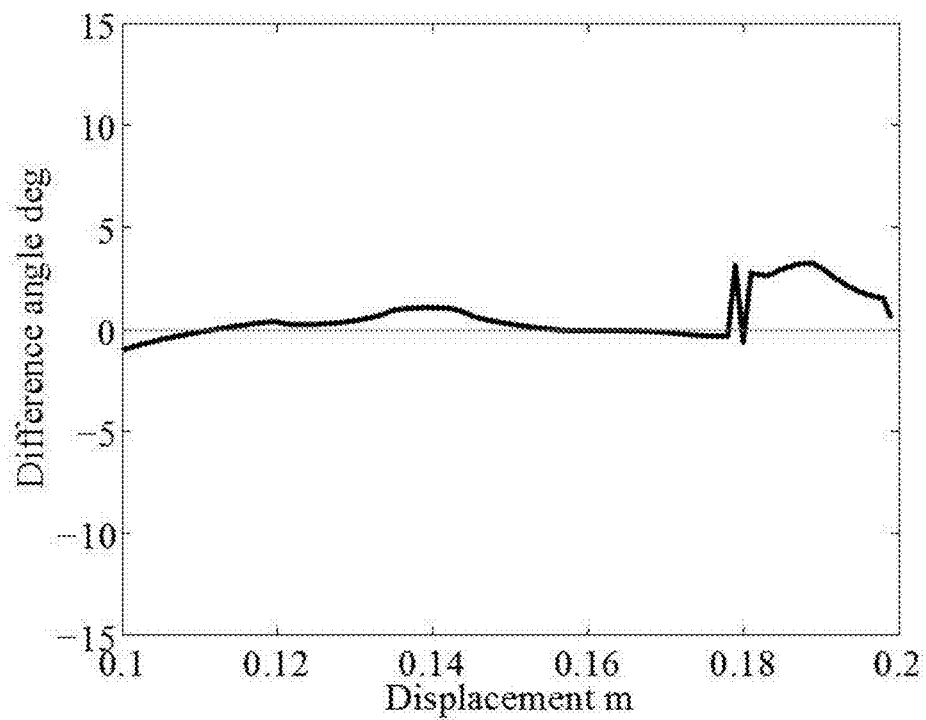
FIGS. 20(a) and 20(b) illustrate simulation results according to the first embodiment.
Figure 20B:
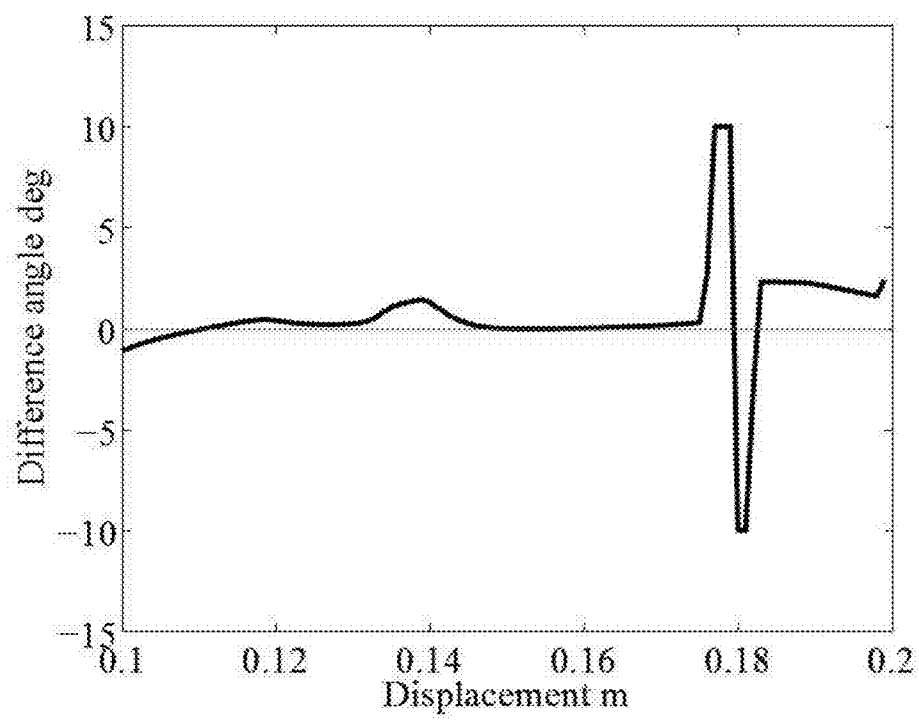

FIGS. 19(a) and (b) show the shape of a continuum robot in a narrow space at base displacement $z_b$=0.151 m. FIG. 20 shows the distribution of curvatures. In FIGS. 19(a) and 20(a) when the second leader following control is used similarly to the response in the case at base displacement $z_b$=0.051 m, advancement is made such that the shape of the continuum robot is along the path. In contrast, as seen in FIGS. 19(b) and 20(b) if the first leader following control is used, it is found that the response is made in which the curvature is saturated at the maximum curvature set at the position around 0.18 m being the leading end of the first bending section, and deformation with a large curvature is generated.

With the simulation responses, it is found that the second leader following control according to the disclosure is effective in the entire region of the path in the narrow space.

Second Embodiment

Figure 21:
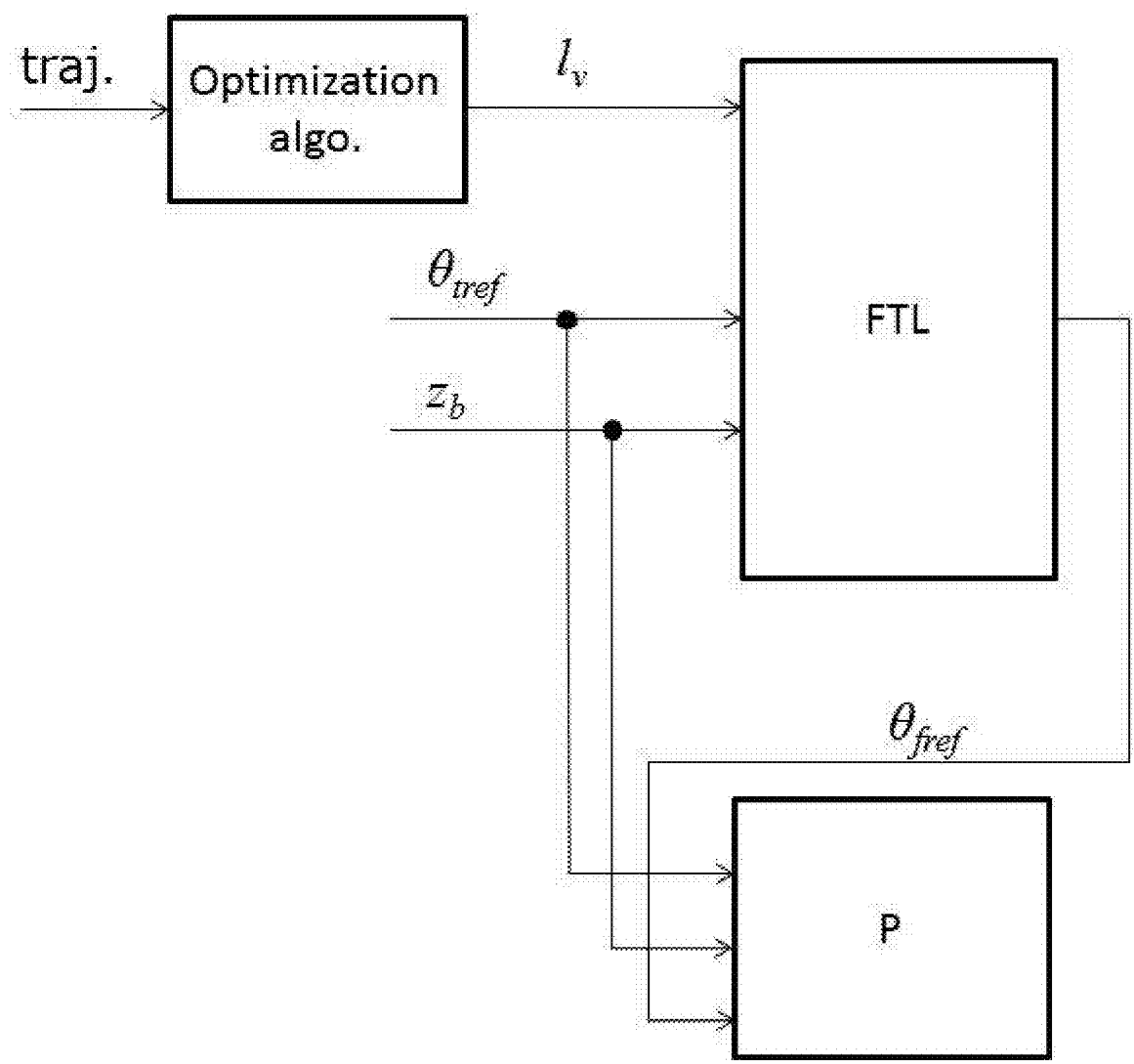
FIG. 21 is a block diagram showing a control system according to a second embodiment.

In the first embodiment, the virtual bending section length $l_v$ is obtained by using the graph shown in FIG. 15. However, if the distance to an obstacle in the periphery of a path, the curvature of the path, and other parameters can be obtained in advance, a proper virtual bending section length can be obtained by calculation by repetitively using the shape prediction calculation used by the simulation according to the first embodiment. In the simulation, when the distance to the obstacle in the path is large, the number of repetitions of the steepest-descent method in the shape prediction of the continuum robot is set at a small number, and thus the distance to the obstacle in the path can be simulated. FIG. 21 is a block diagram showing an optimization algorithm indicating the above-described numerical calculation. In this case, P denotes a control object, FTL denotes a second leader following control algorithm, $l_v$ denotes a virtual bending section length vector, $\theta_{tref}$ denotes a bending angle command value of the most distal end, $_{fref}$ is a bending angle command vector of the most distal end, traj. is the trajectory for the continuum robot. In one embodiment the trajectory is obtained from a known segmentation method and a skeltonization method applied to 3D CT image of tubal structure of an object to be examined. In the processing of Optimization algo., traj. is an input and the virtual bending section length $l_v$ is calculated and output to the FTL algorithm. In optimization, a range of candidate values for $l_v$ is defined, and multiple different candidate values within the range are selected. From the multiple candidate values one value is picked as the virtual bending section length $l_v$, by the "Optimization algo." processing. For each of the candidate values the simulation is performed to obtain a trajectory of the continuum robot, illustrated as the dotted-chain line in FIG. 17(a), by using the method described in the first embodiment. The evaluation value for each obtained trajectory, or each candidate value, is for example an integral value of curvature along displacement m as shown in FIG. 18(a). This evaluation value is for evaluating how the continuum robot bends, so the smaller the evaluation value is, the more the continuum robot fits in the path (here, the input trajectory). A candidate value corresponding to the smallest evaluation value in the selected multiple different candidate values is output as the virtual bending section length $l_v$.

Third Embodiment

In the first embodiment, the manipulator has executed the leader following control by continuously propagating the bending angle of the most distal end by the joystick or the like to the following bending section by the bending section length. In this embodiment, control on the position and control on the angle of the most distal end by inverse kinematics are also used in addition to the leader following control, and thus control for advancement in the path is executed.

While the manipulator gives the bending angle of the most distal end and the advancement amount command of the base, the manipulator gives an advancement amount command $z_{tref}$ of the most distal end instead of the advance amount command of the base.

In this case, the displacement $x_{tn}$, $z_{tn}$ of the most distal end is updated every sampling period of time by a control calculation device.

$$x_{tn} \rightarrow x_{tn} + z_{tref} \sin \theta_n$$

$$z_{tn} \rightarrow z_{tn} \cos \theta_n \qquad (24)$$

By applying this to the kinematics in described in the first embodiment, the bending angle of each bending section and the base displacement for controlling the position and angle of the most distal end at desirable values can be obtained. In this embodiment, a continuum robot having two bending sections is used similarly to the first embodiment. If the number of bending sections is two, the bending sections have no redundancy. A bending angle $\theta_1$ of the first bending section and a base displacement $z_b$ for controlling positions $x_{t2}$, $z_{t2}$, and $\theta_2$ of the most distal end to desirable values can be uniquely obtained by inverse kinematics calculation.

Figure 22:
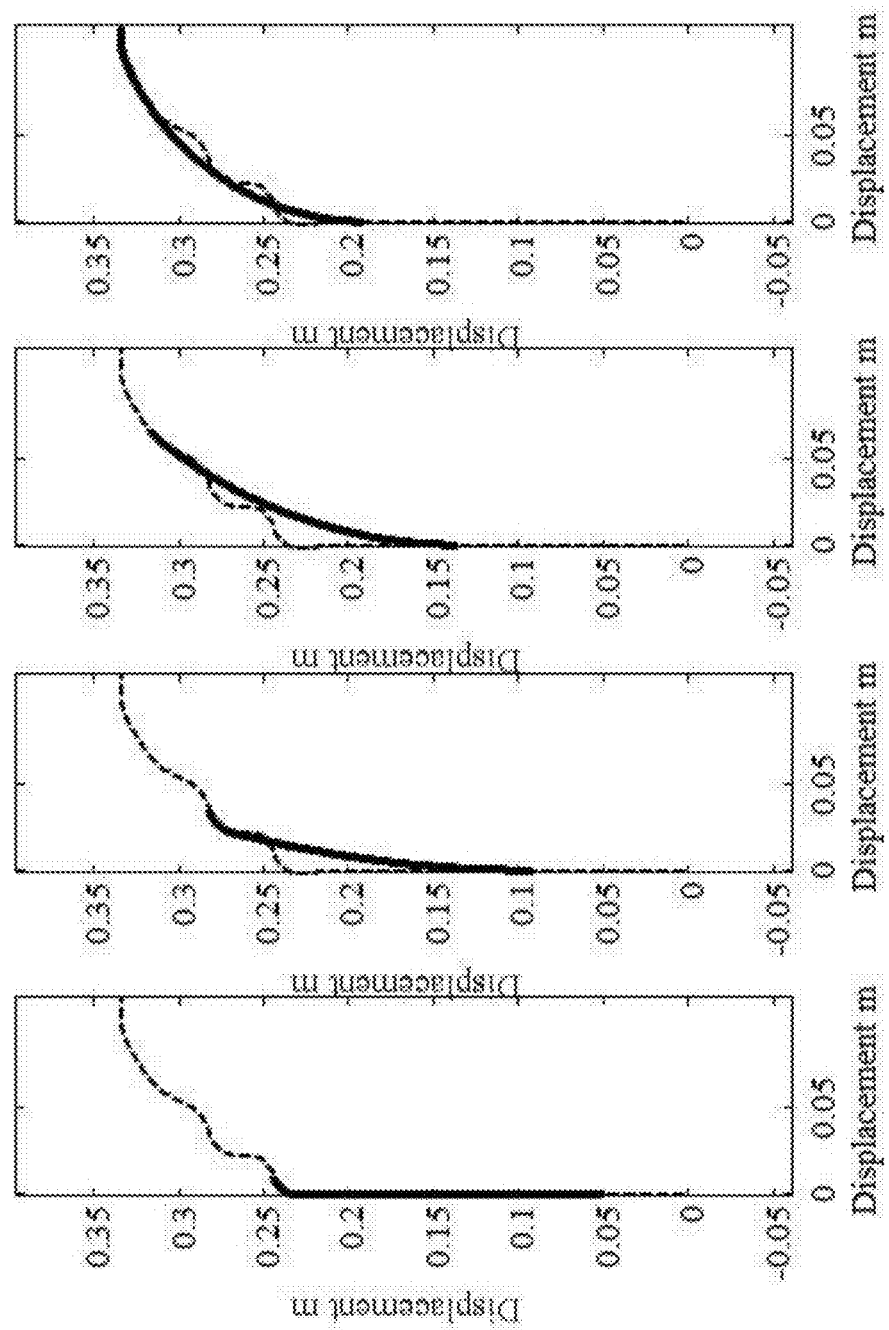
FIG. 22 illustrates simulation results according to a third embodiment.

FIG. 22 shows control responses by inverse kinematics. The solid line indicates the shape of the continuum robot and the broken line indicates the path. It is found that the position and angle of the most distal end of the continuum robot are controlled to constantly meet the path.

Figure 23A:
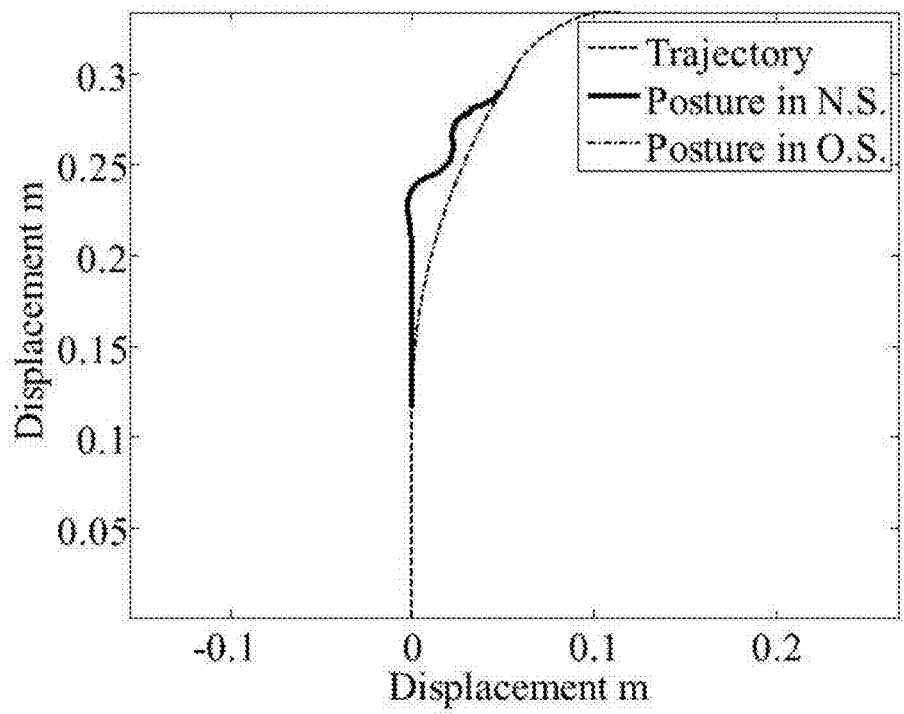
FIGS. 23(a) and 23(b) illustrate simulation results according to the third embodiment.
Figure 23B:
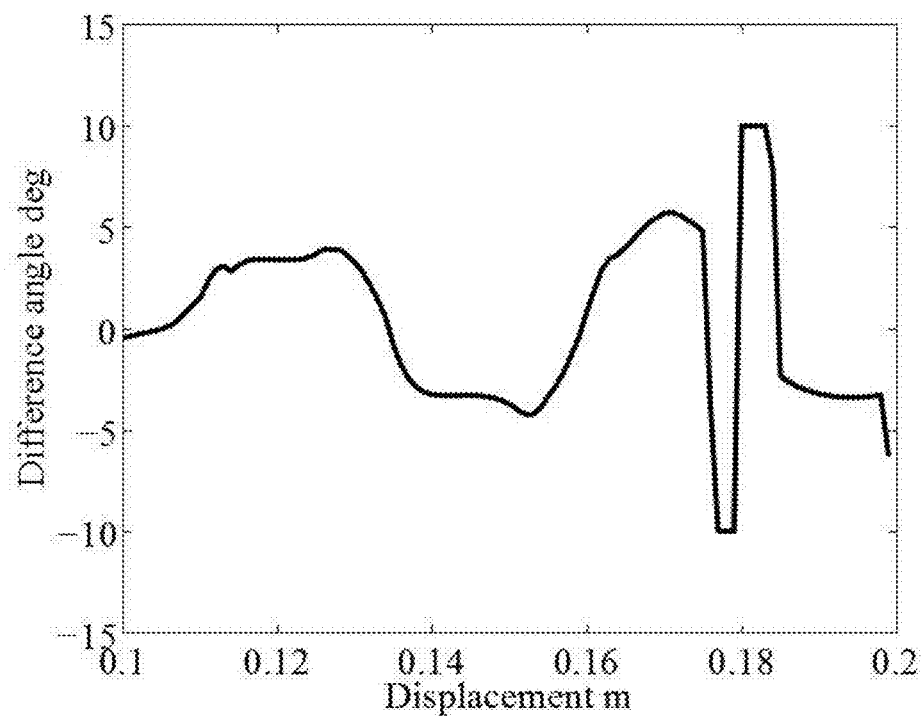

A shape response of the continuum robot in advancement in a narrow space by control of inverse kinematics will now be described. The calculation method for predicting the shape of the continuum robot in the narrow space is similar to the method in the first embodiment. In FIG. 23(a), the solid line indicates the shape of the continuum robot, the broken line indicates the path, and the dotted-chain line indicates the shape of the robot in a space without an obstacle at the same base displacement for reference. FIG. 23(b) shows the distribution of curvatures of the continuum robot with the shape in FIG. 23(a). The control by inverse kinematics considers only the position and angle of the most distal end, and thus it is found that deformation with a large curvature is generated near the distal end of the first bending section similarly to the response in the first leader following control according to the first embodiment. However, regarding positioning performance for the most distal end in the space, an error with respect to the path is less than that of the first leader following control. Owing to this, control by inverse kinematics is effective for the purpose of reaching the entrance of the path with high accuracy, for example, when the distance with respect to the obstacle in the periphery is large to the middle of the path and the entrance of the narrow space is present at a certain point in the space.

Figure 24:
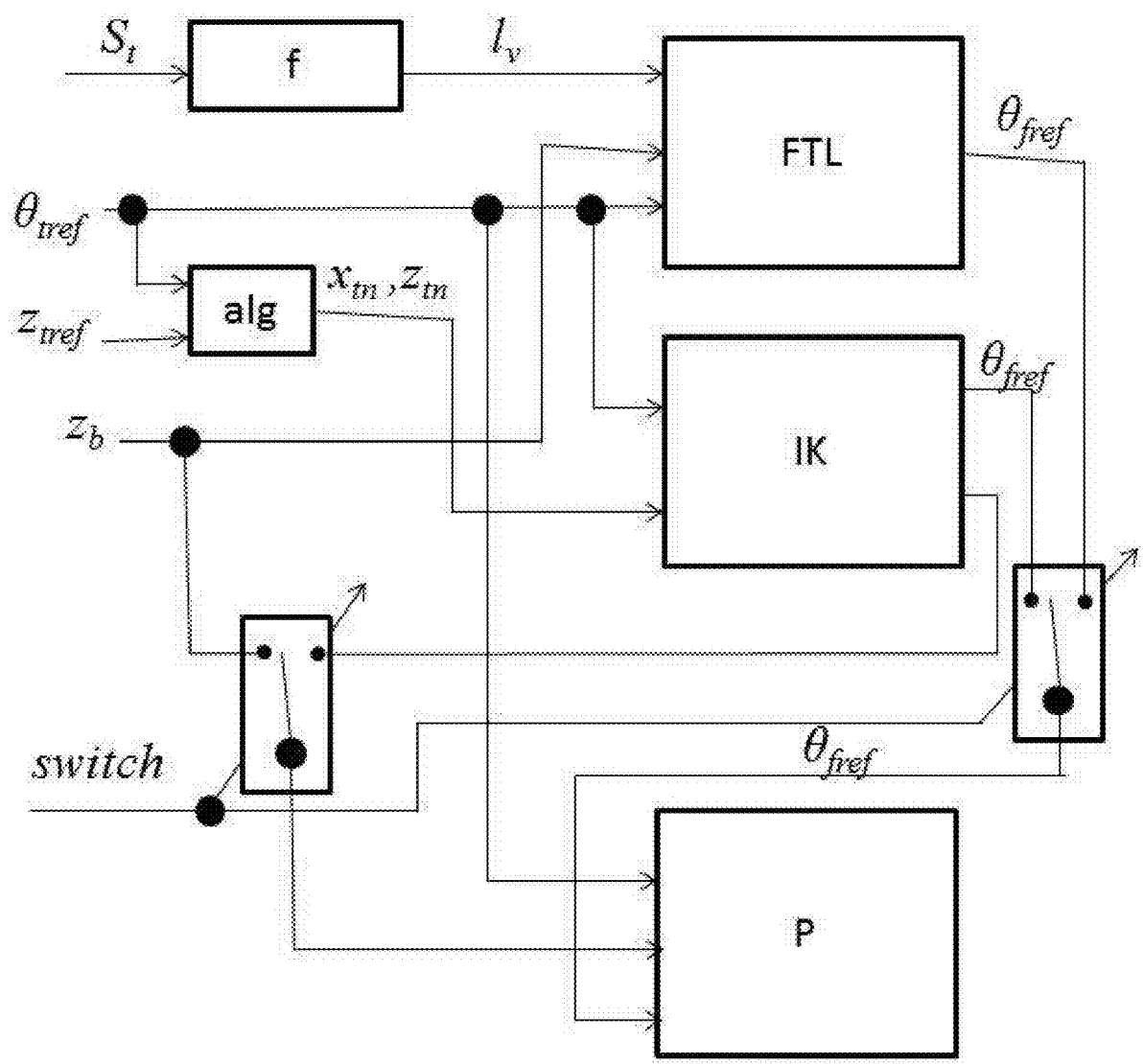
FIG. 24 is a block diagram showing a control system according to the third embodiment.

Thus, this embodiment provides a control algorithm that can desirably switch control between the control by inverse kinematics and the second leader following control method. FIG. 24 is a block diagram. In FIG. 24, alg denotes the algebraic calculation in Expression (24), IK denotes inverse kinematics calculation, and switch denotes a switch input between the control by inverse kinematics and the second leader following control. The virtual bending section length $l_v$ may be obtained by the method according to the second embodiment.

Other Possible Configurations

In some embodiments, such as described in FIG. 7(a), each deforming member, is controlled by three wires. The wires that drive the first deforming section 6c extend through holes provided in the distal members 3b, 3a and guide members 4b, 4a. The wires that drive the first deforming section 6b extend through holes provided in the distal member 3a and guide members 4a.

In some exemplary embodiments, which can be described by FIG. 6, the length of section 6b is 5 to 200 mm and the length of section 6a is 10 to 300 mm, where the lengths are such that: length 6b<length 6a.

In some exemplary embodiments, which can be described by FIG. 7(a), the length of section 6c is 5 to 30 mm, the length of section 6b is 10 to 200 mm, and the length of section 6a is 20 to 300 mm, where the lengths are such that: length 6c<length 6b<length 6a. In an exemplary embodiment, the length of section 6c is 10 mm, the length of section 6b is 20 mm, and the length of section 6a is 100 mm. In other embodiments, two of the sections can have the same length, but the most distal section(s) is shorter than the other section(s).

In some embodiments, the difference in lengths (between 6a and 6b or between 6b and 6c is at least 10%, at least 20%, at least 50% or at least 70%. In some embodiments, the difference in lengths is at least 5 mm, 10 mm, 15 mm, 20 mm, 30 mm, 50 mm, 100 mm, 160 mm, or more. In some embodiments, the difference in lengths is determined by the proposed application, for example, lung or sinus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus which is deformed by a driving force via linear members comprising:
   a first deforming section including a first distal member, a plurality of first guide members, and a plurality of first linear members; and
   a second deforming section provided between the first deforming section and a base of the apparatus, the second deforming section including a second distal member, a plurality of second guide members, and a plurality of second linear members,
   wherein the plurality of first linear members are fixed to the first distal member, and at least one of the plurality of first linear members is further not slidable with respect to the plurality of first guide members and other ones of the plurality of first linear members are slidable with respect to the plurality of first guide members,
   wherein the plurality of second linear members are fixed to the second distal member, and at least one of the plurality of second linear members is not slidable with respect to the plurality of second guide members and other ones of the plurality of the second wires are slidable with respect to the plurality of second guide members,
   wherein the first linear members which are not slidable with respect to the plurality of first guide members extends to the first distal member through the second deforming section and is slidable with respect to the second guide members; and
   wherein the first linear members which are slidable with respect to the plurality of first guide members extend to the first distal member through the second deforming section and are slidable with respect to the second guide members.

2. The apparatus of claim 1, wherein the plurality of first linear members pass through holes provided in the plurality of second guide members and through holes provided in the second distal member.

3. The apparatus of claim 1, wherein the plurality of first linear members and the plurality of second linear members are bendable linear members.

4. The apparatus of claim 1, wherein the number of first linear members is three and the number of second linear members is three.

5. The apparatus of claim 1, further comprising:
   a third deforming section provided between the second deforming section and the base, the third deforming section including a third distal member, a plurality of third guide members, and a plurality of third linear members,
   wherein the length of the first deforming section is shorter than a length of the third deforming section, and
   wherein the plurality of first linear members and the plurality of second linear members extend through the third deforming section.

6. The apparatus of claim 5, wherein the plurality of third linear members are bendable linear members.

7. The apparatus of claim 5, wherein the plurality of first wires pass through holes provided in the plurality of third guide members and through holes provided in the third distal member, and
   wherein the plurality of second wires pass through holes provided in the plurality of third guide members and through holes provided in the third distal member.

8. The apparatus of claim 5, wherein the difference in a length of the first deforming section and a length of the third deforming section is at least 5 mm, 10 mm, 15 mm, 20 mm, 30 mm, 50 mm, 100 mm, or 160 mm.

9. The apparatus of claim 1, wherein the linear member is a piano wire or a metal wire.

10. The apparatus of claim 1, wherein the length of the first deforming sections is shorter than a length of the second deforming section.

11. A continuum robot control apparatus, comprising:
    a continuum robot including a distal bending section and a follower bending section, each bending section driven by a linear member;
    a base with the continuum robot mounted thereon;
    at least one controller which executes instructions to:
    move the base; and
    control a linear member driving amount, applied to the follower bending section, based on the displacement of the base;
    determine the linear member driving amount to be applied to the follower bending section,
    wherein the controller obtains a first base displacement amount and a first bending angle from a command given to a distal end of the distal bending section and obtains a second base displacement amount and the linear member driving amount from a reference table, wherein the second base displacement amount is a sum of the first base displacement amount and a virtual length of the follower bending section, and
    wherein the virtual length of the follower bending section is shorter than an actual length of the follower bending section.

12. The continuum robot control apparatus according to claim 11,
    wherein the controller determines a progression of linear member driving amounts, to be applied to the follower bending section as the base is moved a distance equal to the second base displacement amount, by interpolation.

13. The continuum robot control apparatus according to claim 11,
    wherein the virtual length of the follower bending section is determined by using a second reference table that stores the virtual length of the follower bending section in accordance with a volume or a sectional area of a path in which the continuum robot advances.

14. The continuum robot control apparatus according to claim 13,
    wherein the second reference table is generated by using path information for the path to calculate a bending shape of the continuum robot during the advancement in the path, and calculate two norms of a distribution of curvatures of the bending shape.

15. The continuum robot control apparatus according to claim 11 wherein the controller calculates a most distal end coordinate command on the basis of an advancement amount command and an angle command for the distal bending section, and calculate a linear member driving command for the follower bending section and a displacement of the base on the basis of the most distal end coordinate command.

* * * * *